United States Patent
Sugita et al.

(10) Patent No.: US 7,231,123 B2
(45) Date of Patent: Jun. 12, 2007

(54) PHOTONIC CRYSTAL OPTICAL ELEMENT AND MANUFACTURING METHOD THEREFOR

(75) Inventors: Mitsuro Sugita, Tokyo (JP); Toshihiko Ouchi, Sagamihara (JP); Takao Yonehara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/558,830

(22) PCT Filed: Dec. 20, 2004

(86) PCT No.: PCT/JP2004/019481

§ 371 (c)(1), (2), (4) Date: Nov. 29, 2005

(87) PCT Pub. No.: WO2005/064373

PCT Pub. Date: Jul. 14, 2005

(65) Prior Publication Data

US 2006/0263025 A1    Nov. 23, 2006

(30) Foreign Application Priority Data

Dec. 26, 2003 (JP) ............................. 2003-434555
Feb. 10, 2004 (JP) ............................. 2004-033507

(51) Int. Cl.
*G02B 6/10*    (2006.01)

(52) U.S. Cl. ....................................... 385/129; 385/131

(58) Field of Classification Search .................... None
See application file for complete search history.

(56) References Cited

U.S. PATENT DOCUMENTS

| 6,469,682 | B1 | 10/2002 | de Maagt et al. ............ 343/909 |
| 6,832,036 | B2 * | 12/2004 | Ghoshal et al. .............. 385/143 |
| 2001/0033409 | A1 | 10/2001 | Takada ......................... 359/241 |
| 2003/0142897 | A1 * | 7/2003 | Koike et al. ................... 385/14 |

FOREIGN PATENT DOCUMENTS

| DE | 195 18 371 C1 | 10/1996 |
| EP | 1 010 997 A1 | 6/2000 |
| WO | WO 2004/095092 A1 | 11/2004 |

OTHER PUBLICATIONS

S. Uehara, et al., "Porous Silicon Refractive Index Lattices," Physica Status Solidi (A), Applied Research, vol. 182, No. 1 (Nov. 16, 2000), XP008038283, pp. 443-446.*

(Continued)

*Primary Examiner*—Michelle Connelly-Cushwa
*Assistant Examiner*—Chris Chu
(74) *Attorney, Agent, or Firm*—Fitzpatrick, Cella, Harper & Scinto

(57) ABSTRACT

To provide a novel technique for producing a difference in refractive index between two regions. An optical element according to the present invention includes a first porous region (2002), a second porous region (2004), and a non-porous region (2003) formed between the first porous region (2002) and the second porous region (2004), the non-porous region having a refractive index higher than a refractive index of the first porous region.

4 Claims, 24 Drawing Sheets

OTHER PUBLICATIONS

P.J. Reece, et al., "Porous Silicon: A Photonic Material for All Seasons," Optoelectronic and Microelectronic Materials and Devices, 2002 Conference on Dec. 11-13, 2002, XP010662373, pp. 333-336.*

S. Uehara, et al., "Porous Silicon Refractive Index Lattices," Physica Status Solidi (A), Applied Research, vol. 182, No. 1 (Nov. 16, 2000), XP008038283, pp. 443-446.

H. Arrand, et al. "The Application of Porous Silicon to Optical Waveguiding Technology," IEEE Journal of Selected Topics in Quantum Electronics, vol. 4, No. 6 (Nov. 1998), XP000801343, pp. 975-982.

W. Liu, et al., "Microstructure and Crystallinity of Porous Silicon and Epitaxial Silicon Layers Fabricated on p+Porous Silicon," Journal of Vacuum Science & Technology B: Microelectronics Processing and Phenomena, American Vacuum Society, vol. 21, No. 1 (Jan. 2003), XP012009710, pp. 168-173.

P.J. Reece, et al., "Porous Silicon: A Photonic Material for All Seasons," Optoelectronic and Microelectronic Materials and Devices, 2002 Conference on Dec. 11-13, 2002, XP010662373, pp. 333-336.

Mar. 10, 2005 International Search Report in PCT/JP2004/019481.

Mar. 10, 2005 Written Opinion in PCT/JP2004/019481.

Eli Yablonovitch, "Inhibited Spontaneous Emission in Solid-State Physics and Electronics", Physics Review Letters, vol. 58, No. 20, pp. 2059-2062 (May 1987).

P.J. Reece, et al., "Optical Microcavities with Subnanometer Linewidths Based on Porous Silicon", Applied Physics Letters, vol. 81, No. 26, pp. 4895-4897 (Dec. 2002).

S.S. Iyer, et al. "Silicon Wafer Bonding Technology for VLSI and MEMS Applications", The Institution of Electrical Engineers, London, United Kingdom.

* cited by examiner

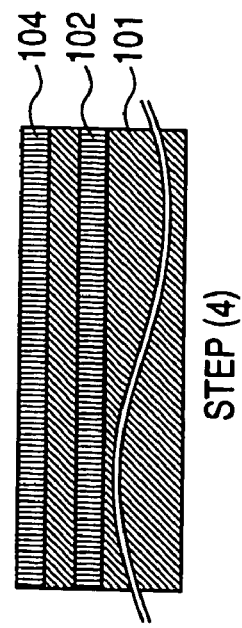
FIG. 1D STEP (4)
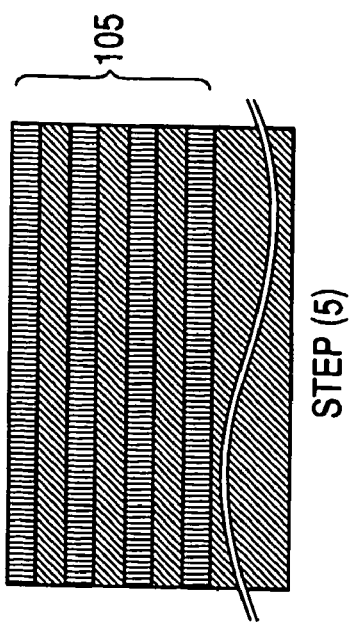
FIG. 1E STEP (5)
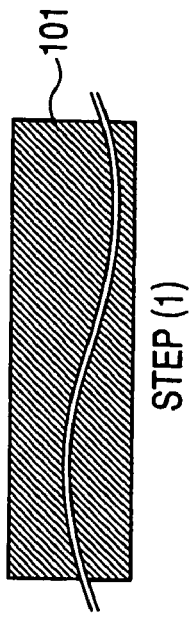
FIG. 1A STEP (1)
FIG. 1B STEP (2)
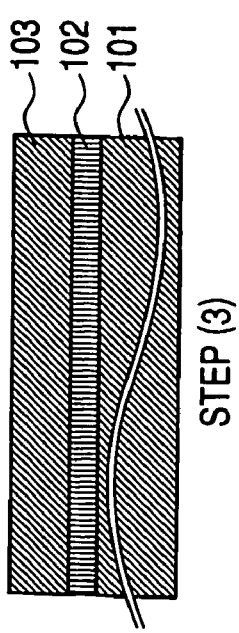
FIG. 1C STEP (3)

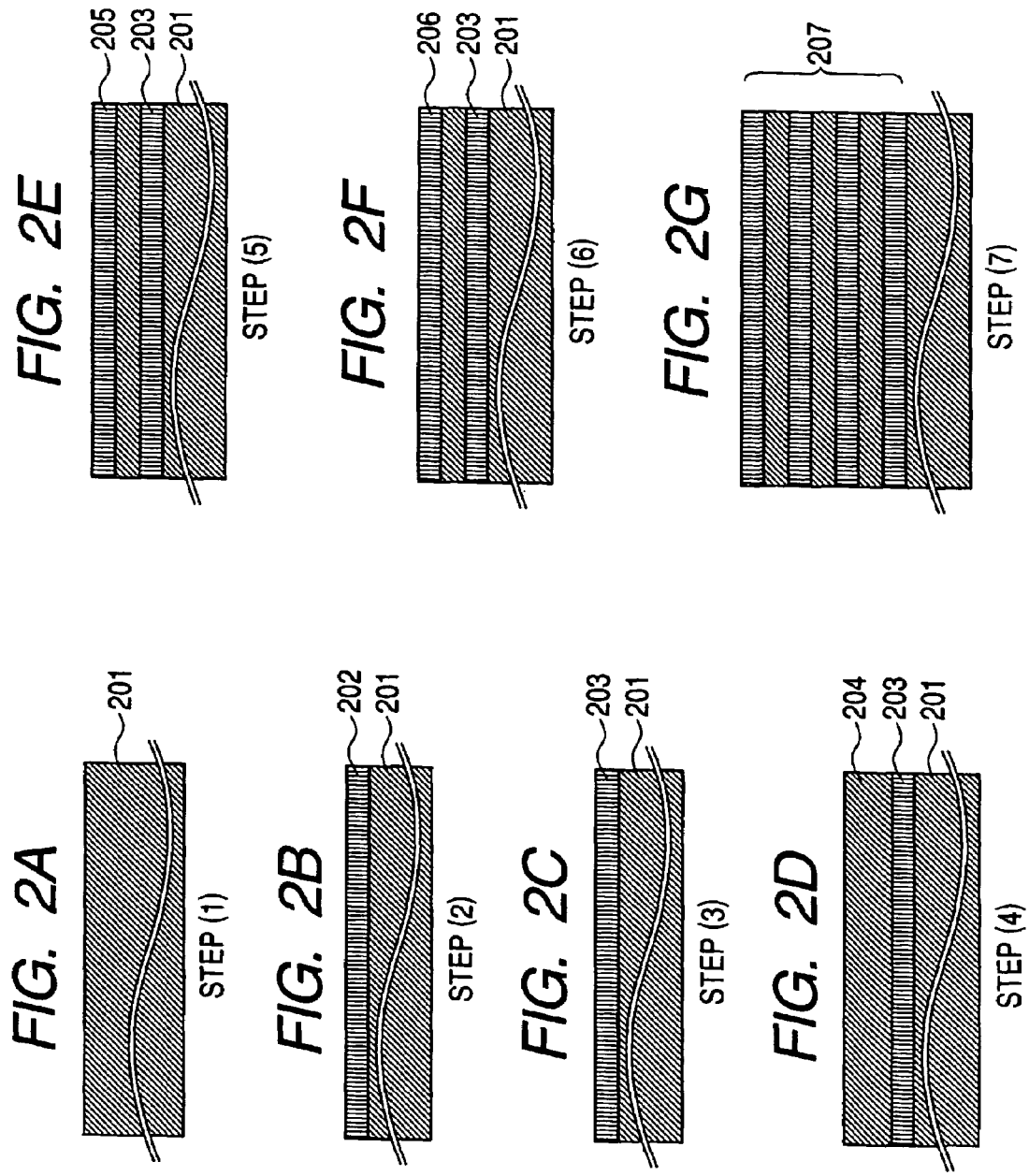

STEP (1)

STEP (4)

STEP (2)

STEP (5)

STEP (3)

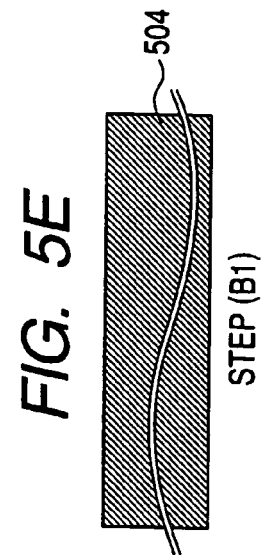
FIG. 5A STEP (A1)
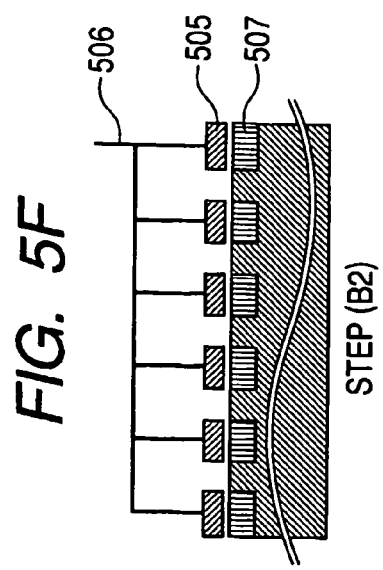
FIG. 5B STEP (A2)
FIG. 5C STEP (A3)
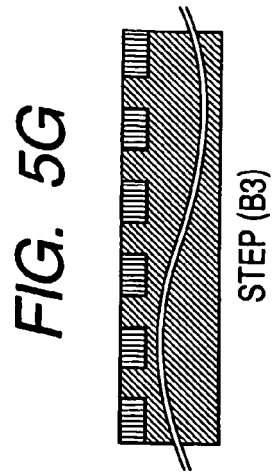
FIG. 5D STEP (A4)
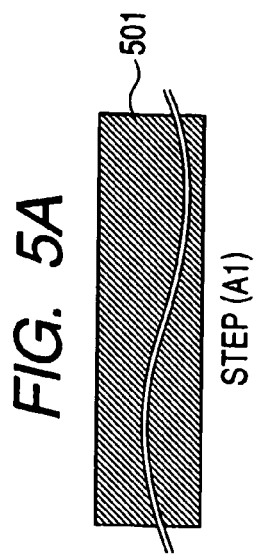
FIG. 5E STEP (B1)
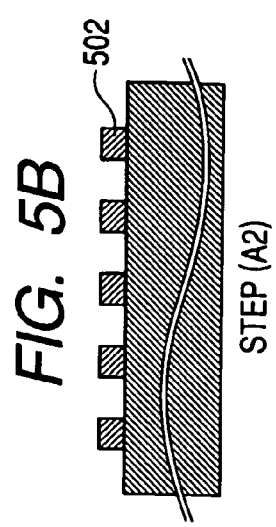
FIG. 5F STEP (B2)
FIG. 5G STEP (B3)
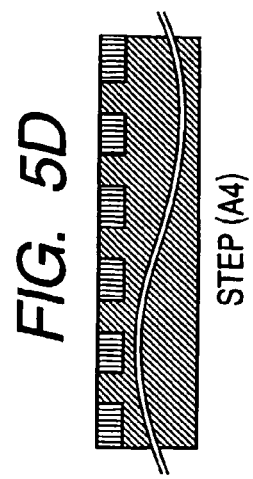

601  602

603  604

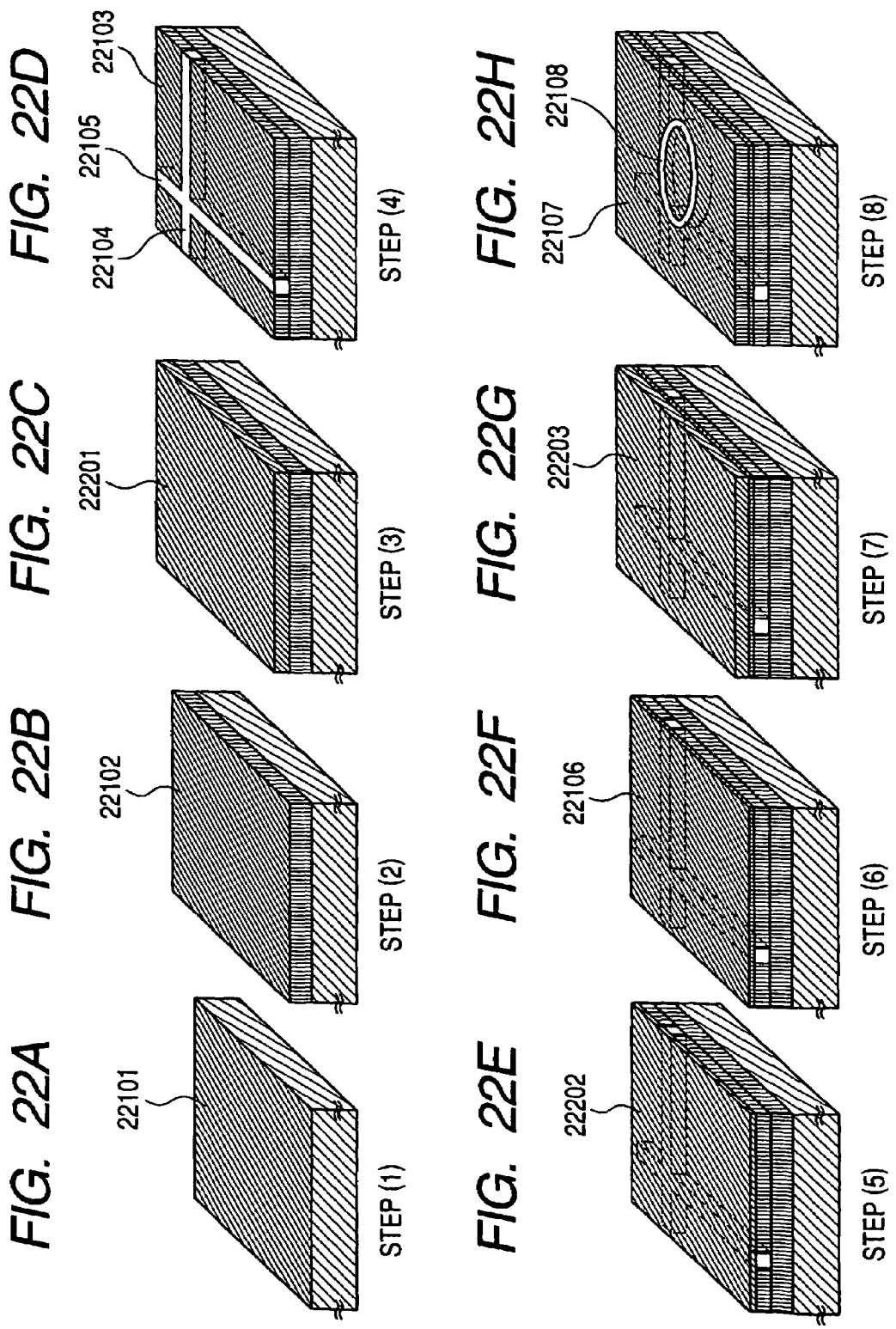

STEP (B1)

STEP (B2)

STEP (B3)

STEP (A1)

STEP (A2)

STEP (A3)

STEP (A4)

PHOTONIC CRYSTAL OPTICAL ELEMENT AND MANUFACTURING METHOD THEREFOR

TECHNICAL FIELD

The present invention relates to an optical element that is applicable in association with electromagnetic waves including a visible light, a terahertz wave, a microwave, and an X-ray, and a manufacturing method therefor. The present invention also relates to an optical element used in association with an optical communication and an information processor using light, and a manufacturing method therefor.

BACKGROUND ART

In recent years, an optical element categorized as a photonic crystal (PC) has attracted an attention.

This is mainly owed to techniques in which a periodic structure of an optical material is formed to produce a periodic refractive index profile caused by a difference in refractive index, thereby making effective use of behavior of light in such a specific refractive index profile, or making effective use of such a phenomenon that, when the structure having a specific refractive index profile includes a light emitting material etc., its light emission state is controlled (see, E. Yablonovitch "Phys. Rev. Lett." Vol. 58, p. 2059, 1987). Heretofore, an applicability of an optical element based on those techniques has become a controversial subject.

Regarding the optical element techniques, hitherto, a so-called distributed feedback (DFB) laser attained by exploiting a one-dimensional periodic structure to a semiconductor laser has already come into practical use. This may be called an optical element to which a one-dimensional photonic crystal is applied.

Further, in recent years, there has been an impressive development on a laser element, a so-called vertical cavity surface emitting laser (VCSEL) as well. As shown in FIG. 18, however, in this element, light-confinement in a light emitting direction, i.e. a direction vertical to a substrate surface, is effected by two multilayered film mirrors 1801 and 1802 made up of a porous compound semiconductor formed through epitaxial growth, while light-confinement in a horizontal direction with respect to the substrate surface is realized according to the principle that total reflection at the boundary between a cylindrical semiconductor and the air allows light-confinement; this is because the entire cylindrical semiconductor has a higher refractive index than its surrounding substance (air) like a core of an optical fiber.

In general, well known as a manufacturing method for the multilayered film mirror is a deposition or sputtering method. In the case of aiming at ones having a high quality, small loss, and high matching property with an active layer (light emitting material layer) like a surface emitting laser, an epitaxial growth technique capable of producing a crystal having a monolithic structure or a substantially monolithic structure over multiple layers is inevitably used.

Meanwhile, there has been known regarding the multilayered film mirror another monolithic manufacturing method aside from the epitaxial growth technique, for example, a technique disclosed in Lehman Reece et al. "Applied Physics Letters", Vol. 81 (2002), pp. 4895. The disclosed technique is such that a silicon substrate is anodized in an HF solution, and an intensity of an electric field applied at this time is modulated periodically with respect to time, whereby two layers having different porosities are alternately formed. The silicon that has been made porous through anodization maintains its crystallinity, i.e. monolithic quality, even after turned porous since the substrate is originally made of single crystal. Also, as disclosed in the document, low-temperature anodization affords a more uniform interfacial structure between layers, so a multilayered film of optical quality can be formed.

Nowadays, the most popular one among study cases that are being reported as the "photonic crystal" is a two-dimensional photonic crystal formed by a process of patterning a two-dimensional periodic structure to a slab-shaped semiconductor etc. In particular, there are made extensive studies on the basic principle of application of the two-dimensional photonic crystal having a two-dimensional structure of cylindrical pores to optical communication parts, for example.

In such a two-dimensional photonic crystal, a light-confinement performance in one non-periodic direction (in general, in a thickness direction) may be inferior to those in the remaining two periodic directions in terms of light confinement under control. In contrast, some attempts have been made to obtain a periodic structure in all of the three directions, i.e. a so-called three-dimensional (3D) photonic crystal structure.

As for the three-dimensional photonic crystal developed so far, for example, there is an element called a double-cross or wood-pile type element, which is manufactured by a laminating method (see, Noda "Photonic Crystal Technique and its Application" p. 128, 2002, CMC publishing, Co. Ltd.). Given as another example thereof is an element manufactured by a micromechanics manufacturing method (see, Hirayama et al. "Photonic Crystal Technique and its Application" p. 157, 2002, CMC publishing, Co., Ltd.). Besides, given as still another example thereof is an element manufactured by a thin-film lamination growth method called self-cloning (Japanese Patent Publication No. 3325825 B or Sato "Photonic Crystal Technique and its Application" p. 229, 2002, CMC Publishing).

DISCLOSURE OF INVENTION

The present invention provides novel means for producing a difference in refractive index between two regions.

In the present invention, as the difference in refractive index between two regions, a difference in refractive index between a porous region and a non-porous region is utilized.

More specifically, an optical element according to one aspect of the present invention includes: a first porous region; a second porous region; and a non-porous region formed between the first porous region and the second porous region, the non-porous region having a refractive index higher than a refractive index of the first porous region.

Also, in the optical element according to the present invention, a first layer including the first porous region may be formed, a second layer including the second porous region may be formed, and a third layer including the non-porous region may be formed between the first layer and the second layer and have a region with a refractive index different from the refractive index of the non-porous region, in its in-plane direction.

Note that the region in the third layer with the refractive index different from the refractive index of the non-porous region may have a porous structure.

Also, the non-porous region may function as an optical waveguide, and a spacer layer of a porous structure may be formed between the second layer and the third layer.

Here, the formed spacer layer may include a plurality of regions different in refractive index, in its in-plane direction, for example.

Also, it is possible to provide an information processor, including: the optical element; and a light emitting portion, for example.

Also, in order to solve the afore-mentioned problems, according to another aspect of the present invention, there is provided a monolithic optical element, including: at least one porous layer having a pore size smaller than a light wavelength; and at least one crystal layer having a refractive index higher than a refractive index of the porous layer, the porous layers and the crystal layers being laminated on one another, in which the crystal layer having the higher refractive index is of a single crystal structure over a plurality of layers thereof, and two of the porous layers sandwiching the crystal layer having the higher refractive index are not connected through a hole.

Also, according to another aspect of the present invention, there is provided a method for manufacturing a monolithic optical element, including the steps of: turning porous a surface of a crystal layer; and conducting epitaxial growth of a crystal layer from the porous surface, the turning and promoting steps being repeated to laminate the porous layer and the crystal layer.

Also, the method for manufacturing a monolithic optical element according to the present invention is applicable to a method for manufacturing an optical element described below, for example.

A laser can be obtained by introducing a laser medium into a predetermined layer in the laminated structure (see Example 5 described later). The predetermined layer in the laminated structure may have a non-periodic pattern in a predetermined in-plane position, and the laser medium may be introduced in the periodic pattern position and its vicinity. It is possible to introduce a non-linear optical medium to compose a high-efficiency optical switch in the same way that the laser medium is introduced to compose the laser.

Further, the present invention can provide an optical waveguide by interposing a non-porous region between porous regions.

Also, according to the present invention, it is possible to realize an interchange of thin waveguides or microring resonators using a core and clad with a large difference in refractive index by repeating anodization for forming a porous portion, porous patterning (porous pattern formation), and epitaxial growth.

Also, a monolithic waveguide coupling optical element according to the present invention, which includes at least one porous layer having a pore size smaller than a light wavelength; at least one crystal layer having a refractive index higher than a refractive index of the porous layer, the porous layer and the crystal layer being laminated to three or more layers on a substrate comprises at least one optical waveguide for propagating a light; and a waveguide coupling portion for selectively coupling light propagation paths for propagation of light in different directions in the optical waveguides, in which the optical waveguide has a core made up of the crystal layer having the higher refractive index, and a clad made of a porous material, and the crystal layer having the higher refractive index is of a single crystal structure over a plurality of layers thereof.

Here, the waveguide coupling portion is a resonator, for example.

Also, in the waveguide coupling optical element, the waveguide and the resonator sandwich a spacer layer.

The spacer layer may be formed of a porous material, and the porosity of the porous material may be controlled.

Also, a method for manufacturing an optical element according to the present invention includes the steps of: forming a porous layer having a pore size smaller than a light wavelength on a substrate; forming a crystal layer having a refractive index higher than a refractive index of the porous layer on the porous layer through epitaxial growth; and turning porous a part or all of a surface of the crystal layer formed through the epitaxial growth.

Now, the property meant by the term "single crystal structure" referred to in the present invention will be described below.

In the present invention, the "single crystal structure" is assumed to be "actual single crystal". To be specific, even if any defects inevitably involved under actual conditions, that is, non-uniform crystallinity and variation in crystal orientation are locally caused, any crystal can be called crystal having a single crystal structure in principle insofar as the crystal is produced by a crystal growth method or a manufacturing method where manufacturing conditions are controlled with a view to producing single crystal.

Also, even a porous crystal may be assumed to have the single crystal structure as far as a portion other than pores of the porous crystal maintains its crystallinity. For example, a single crystal made porous through anodization can be assumed to have the single crystal structure. Further, in a case of conducting epitaxial growth of a non-porous crystal continuously from the porous surface, a porous layer and non-porous layer can be assumed to form a single crystal together (continuously).

Also, the term "monolithic" referred to in the present invention means not only an optical element structure having plural refractive index profiles, which takes on the single crystal structure in its entirety, but also a structure that takes on the single crystal structure but is partially made amorphous through oxidation.

In such a case, to discuss a concern about whether or not the structure has the single crystal structure, the entire crystal portion excluding the amorphous portion does not lose its original crystallinity or crystal orientation even if a little translational or angular deviation occurs in its entirety. In this case, it can be assumed to maintain the single crystal structure. Note that the amorphous portion is out of a category of crystal and thus, needless to say, does not have the single crystal structure.

To give specific examples of the above, for example, in a case of thermally oxidizing a porous silicon portion of a monolithic multilayered film having the single crystal structure in its entirety and formed by laminating a silicon crystal layer and a porous silicon crystal layer, into an amorphous form (porous $SiO_2$), even when the silicon crystal undergoes separation between different layers in the multilayered film through the amorphous layer, the original structure thereof is the single crystal structure, so the silicon crystal layer can be assumed to have the single crystal structure throughout the multilayered film even with a little translational or angular deviation in its entirety.

Meanwhile, to give an example of a non-monolithic one, for example, after separately forming a thin film of the single crystal structure and a multilayered film, these are bonded through wafer bonding etc. for lamination. In such a case, the resultant laminate is not regarded as monolithic. Besides, in this case, a crystal region extending across the bonded surface does not, needless to say, have the single crystal structure.

BRIEF DESCRIPTION OF THE DRAWINGS

FIGS. 1A, 1B, 1C, 1D and 1E are schematic diagrams each showing a manufacturing method for a one-dimensional photonic crystal using Si according to Example 1 of the present invention;

FIGS. 2A, 2B, 2C, 2D, 2E, 2F and 2G are schematic diagrams each showing a manufacturing method for a one-dimensional photonic crystal including porous $SiO_2$ according to Example 2 of the present invention;

FIGS. 5A, 5B, 5C, 5D, 5E, 5F and 5G are schematic diagrams each showing an in-plane patterning method for anodization according to Example 4 of the present invention;

FIGS. 22A, 22B, 22C, 22D, 22E, 22F, 22G and 22H are schematic diagrams each showing a manufacturing method for the optical element according to Example 6 of the present invention;

BEST MODE FOR CARRYING OUT THE INVENTION

Hereinafter, the present invention will be described in detail.

First Embodiment Mode

Figure 20:
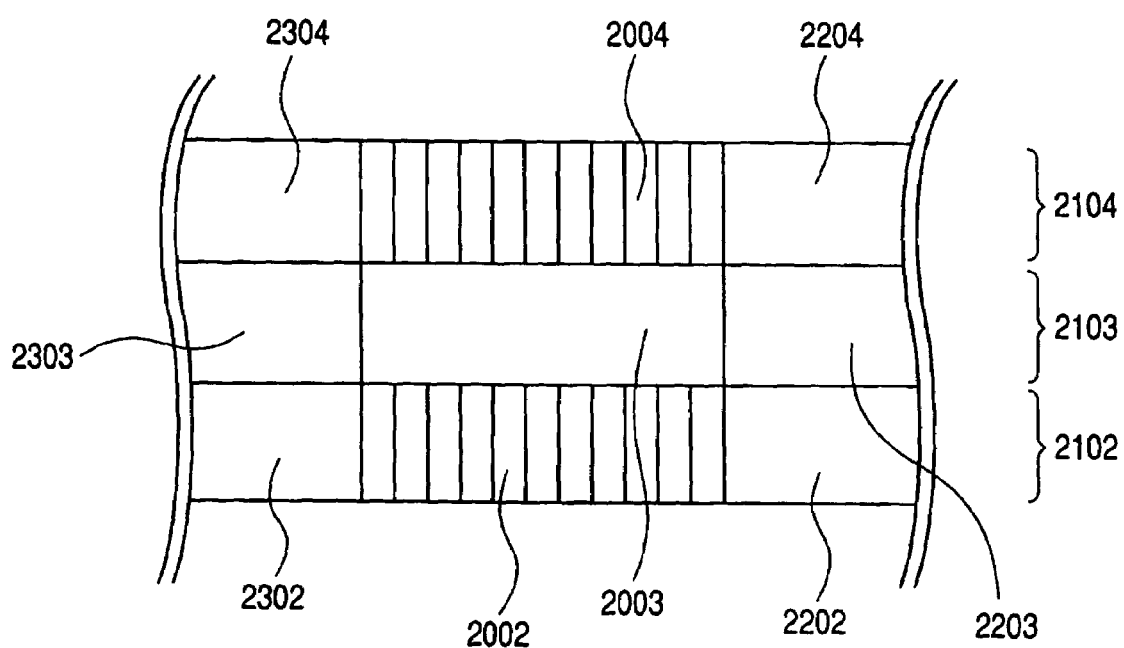
FIG. 20 is a schematic sectional diagram for explaining the present invention.

Referring to FIG. 20, an optical element according to the present invention will be described.

In FIG. 20, reference numeral 2002 denotes a first porous region; 2003, a non-porous region; and 2004, a second porous region.

Here, the non-porous region 2003 has a refractive index higher than that of the first porous region.

In this way, the present invention makes use of a structural difference like a difference between the porous structure and the non-porous structure to produce a difference in refractive index between two regions.

Note that in FIG. 20, reference numeral 2102 denotes a first layer including the first porous region 2003; 2103, a third layer including the non-porous region 2003; and 2104, a second layer including the second porous region.

Regions 2202 and 2302 sandwiching the first porous region 2002 in the first layer 2102 may have either the same structure as that of the first porous region 2002 or the non-porous structure. In other words, a refractive index profile pattern realized by the porous structure and the non-porous structure may be formed in an in-plane direction of the first layer 2102, or a periodic structure may be formed in the in-plane direction.

Regions 2204 and 2304 sandwiching the second porous region 2004 in the second layer 2104 may have either the same structure as that of the second porous region 2004 or the non-porous structure. In other words, a refractive index profile pattern realized by the porous structure and the non-porous structure may be formed in an in-plane direction of the second layer 2104, or a periodic structure may be formed in the in-plane direction.

Regions 2203 and 2303 sandwiching the non-porous region 2003 in the third layer 2103 may have either the same structure as that of the non-porous region 2003 or the porous structure. In other words, the third layer 2103 may have a region having a refractive index different from that of the non-porous region 2003, in its in-plane direction. Also, a refractive index profile pattern realized by the porous structure and the non-porous structure may be formed in the in-plane direction of the third layer 2103, or a periodic structure may be formed in the in-plane direction.

In addition, another layer may be interposed between the first layer 2102 and the third layer 2103 or between the third layer 2103 and the second layer 2104.

Further, the third layer 2103 may be comprised of plural layers.

Note that it is preferable to set the refractive index of the non-porous region 2003 higher than those of the first porous region 2002 and second porous region 2004.

Also, the thicknesses of the first layer 2102 and/or the second layer 2104 may be set smaller or larger than that of the third layer 2103.

Furthermore, in FIG. 20, a description has been made using three regions, i.e. the two porous regions 2002 and 2004 and the one non-porous region 2003. It is possible to laminate additional plural non-porous regions and porous regions on the second porous region 2004.

Second Embodiment Mode

A description will be given later in Examples 7 and 8 of the present invention, of an optical element so configured as to optically couple a thin waveguide with a microring resonator as an optical waveguide utilizing a difference in refractive index between the porous region and the non-porous region.

Here, each of reference symbols in the accompanying drawings is explained.

Reference numerals 101, 201, 401, 501, and 504 denote an Si substrate (single-crystal substrate).
Reference numerals 102, 202, 402, 503, 507, 601, and 603 denote a porous silicon layer.
Reference numerals 103, 204, and 403 denote an epitaxial growth Si layer.
Reference numerals 203, 207, and 305 denote a porous $SiO_2$ layer.
Reference numeral 304 denotes periodically arranged through-holes.
Reference numeral 502 denotes a resist pattern.
Reference numeral 505 denotes a microelectrode.
Reference numeral 506 denotes a wiring.
Reference numeral 1201 denotes a curved structure to be approximated.
Reference numeral 1202 denotes a porous silicon having a curved structure approximated using plural layers.
Reference numeral 1203 denotes an epitaxial growth silicon.
Reference numeral 1301 denotes an Si substrate for manufacturing a photonic crystal.
Reference numeral 1304 denotes a Pt-made surface electrode.
Reference numeral 1305 denotes a lower supporting member.
Reference numeral 1306 denotes an upper supporting member.
Reference numeral 1307 denotes an anode.
Reference numeral 1308 denotes a Pt mesh electrode.
Reference numeral 1309 denotes a cathode.
Reference numeral 1402 denotes a holder.
Reference numerals 1403 and 1303 denote an O-ring.
Reference numeral 1404 denotes a suction portion.
Reference numerals 1405 and 1302 denote an HF solution.
Reference symbols 1406a and 1406b denote a platinum electrode.
Reference numeral 1408 denotes an HF solution tank (anodization tank).
Reference numeral 1409 denotes a holder groove.
Reference numeral 1501 denotes a lower three-dimensional photonic crystal.
Reference numeral 1502 denotes an upper three-dimensional photonic crystal.
Reference numeral 1503 denotes a laser medium layer.
Reference numeral 1504 denotes an in-plane point defect.
Reference numeral 1601 denotes a three-dimensional photonic crystal.
Reference numeral 1602 denotes a laser medium.
Reference numerals 1701 and 1702 denote a one-dimensional photonic crystal.
Reference numeral 1703 denotes a resonator spacer layer.
Reference numeral 1704 denotes a laser medium active substance.
Reference numerals 1801 and 1802 denote an epitaxial growth multilayered film mirror.
Reference numeral 1803 denotes a resonator spacer layer.
Reference numeral 1804 denotes a laser medium active layer.
Reference numeral 1901 denotes a porous silicon.
Reference numeral 1902 denotes an epitaxial growth silicon.
Reference numeral 1903 denotes a porous $SiO_2$.
Reference numeral 1904 denotes the air.
Reference numeral 21101 denotes a silicon (single-crystal) substrate.
Reference numeral 21102 denotes a porous silicon clad layer.
Reference numeral 21103 denotes a porous silicon waveguide layer.
Reference numerals 21104, 701, and 704 denote a silicon waveguide (core).
Reference numerals 21105, 702, and 705 denote a silicon waveguide (core).
Reference numeral 21106 denotes a porous silicon spacer layer.
Reference numeral 21107 denotes a porous silicon resonator layer.
Reference numerals 21108, 703, and 706 denote a silicon microring resonator (core).
Reference numeral 21109 denotes an incident light.
Reference numerals 21110 and 21111 denote an outgoing light.
Reference numeral 22201 denotes an epitaxial growth silicon layer (waveguide layer).
Reference numeral 22202 denotes an epitaxial growth silicon layer (spacer layer).
Reference numeral 22203 denotes an epitaxial growth silicon layer (resonator layer).
Reference numeral 23301 denotes an Si substrate.
Reference numeral 23302 denotes an HF solution.
Reference numeral 23303 denotes an O ring.
Reference numeral 23304 denotes a Pt surface electrode.
Reference numeral 23305 denotes a lower supporting member.
Reference numeral 23306 denotes an upper supporting member.

Reference numeral 23307 denotes an anode.
Reference numeral 23308 denotes a Pt mesh electrode.
Reference numeral 23309 denotes a cathode.
Reference numeral 24401 denotes an Si substrate.
Reference numeral 24402 denotes a vacuum chuck pipe.
Reference numeral 24403 denotes a wafer holder.
Reference numeral 24404 denotes an HF solution tank.
Reference numeral 24405 denotes an HF solution.
Reference numeral 24406 denotes an anode.
Reference numeral 24407 denotes a cathode.
Reference numeral 25501 denotes a silicon substrate.
Reference numeral 25502 denotes a resist pattern.
Reference numeral 25505 denotes a microelectrode.
Reference numeral 25506 denotes a wiring.
Reference numeral 26601 denotes a waveguide.
Reference numeral 26602 denotes a microring resonator.
Reference numeral 26603 denotes a spacer layer in a first region (perspective diagram).
Reference numeral 26604 denotes a spacer layer in a second region (perspective diagram).
Reference numerals 26605 to 26611 denote spacer layers in third to fifth regions (perspective diagram).

EXAMPLES

Hereinafter, the present invention will be described in more detail based on examples. However, the present invention is not limited to these examples.

Example 1

This example relates to a photonic crystal (multilayered film structure) produced by a method of repeating epitaxial growth and anodization according to the present invention, and a one-dimensional photonic crystal (multilayered film structure) produced by carrying out a method for manufacturing a nanophotonic element. In particular, this example relates to a photonic crystal using silicon as a material therefor.

Referring to FIGS. 1A to 1E, a manufacturing method for a multilayered film structure according to this example will be described.

On a surface of a silicon substrate 101 (single-crystal substrate obtained through crystal growth by a Czochralski method etc.) as shown in FIG. 1A (Step(1)), a porous silicon layer 102 is formed through anodization as shown in FIG. 1B (step (2)). Note that in the following description, the anodization in the present invention is desirably effected with an electrolyte at a low temperature of 0° C. or lower, for example, about −20° C. This is because a boundary surface of the porous crystal resulting from the anodization is made smooth to prevent an optical loss, i.e. light scattering etc. Also, the term "porous" used in the present invention means one with a pore size of about 1/100 or smaller of a wavelength of light used; for example, with respect to the light having a wavelength of 1.5 μm, a so-called Mesoporous-Si or Microporous-Si having a pore size of 10 nm or smaller is formed.

Figure 13:
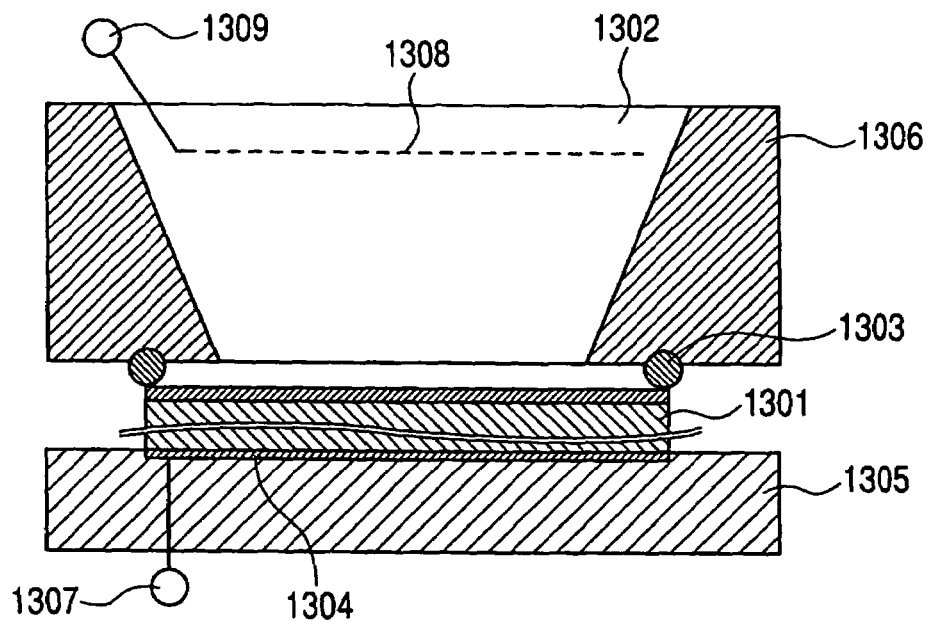
FIG. 13 is a schematic sectional diagram showing an example of an anodization method.

FIG. 13 is a schematic diagram showing a structure example of a device for turning a wafer surface into a porous layer through anodization. In FIG. 13, a wafer 1301 is held such that its surface is immersed in a HF solution 1302. The holding operation is carried out by a lower supporting member 1305 and an upper supporting member 1306 through the intermediation of an O-ring 1303 and a Pt surface electrode 1304. The upper supporting member 1306 is provided with a HF solution tank communicating with the wafer 1301, which is filled with the HF solution 1302. A Pt mesh electrode 1308 is placed in the HF solution 1302. The Pt surface electrode 1304 and the Pt mesh electrode 1308 are connected to an anode 1307 and a cathode 1309, respectively. A predetermined electric field is applied to the surface of the wafer 1301 through the HF solution 1302 on the side of the cathode 1309 and through the substrate on the side of the anode 1307 for carrier injection.

Note that the structure for anodization is not limited to that of this example but generally-employed various methods can be used as appropriate.

Anodization conditions are listed below:
Starting wafer: P+(100)Si 0.01 $\Omega^{-cm}$
Solution: HF, $C_2H_5OH$, and $H_2O$
Anodization current: 150 mA/cm$^3$ As regards an anodization method, it is also possible to collectively process the plural wafers with a device structure shown in FIG. 14. Hence, this step can be preformed at a low cost.

Figure 14:
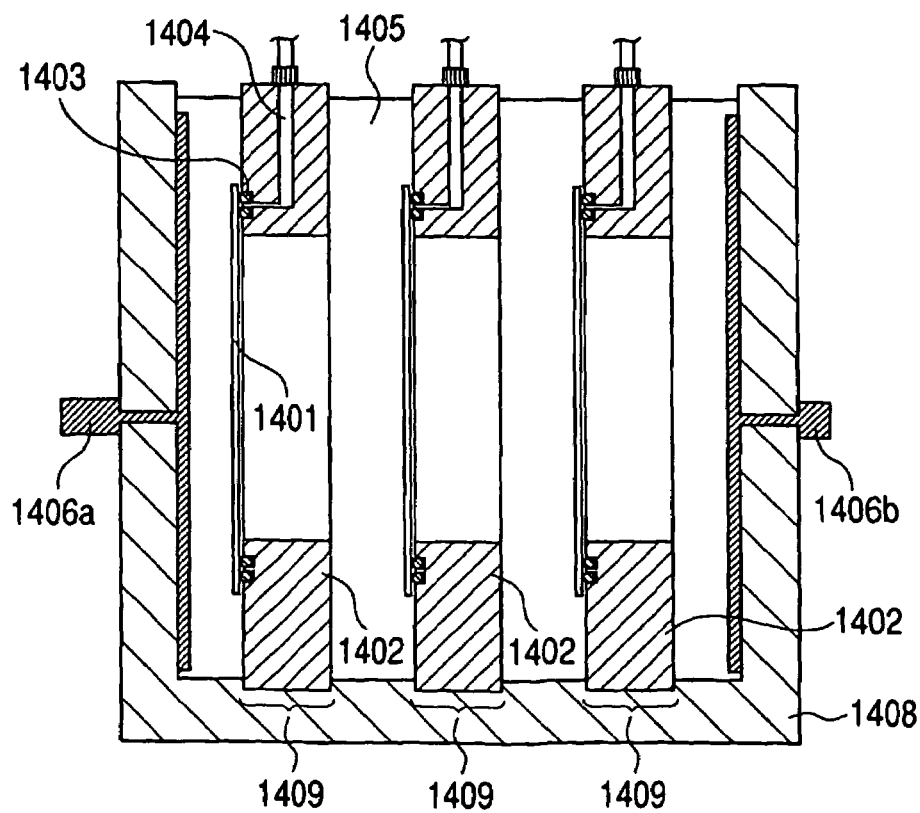
FIG. 14 is a schematic sectional diagram showing an example of a batch anodization method for plural wafers.

For example, it is also possible to collectively process plural wafers 1401 with a device structure shown in FIG. 14. In FIG. 14, reference numeral 1402 denotes a wafer holder; 1403, an O-ring; 1404, a suction portion; 1405, a HF solution; 1406a and 1406b, platinum electrodes; 1408, an anodization tank; and 1409, a holder groove. Further, the structure for anodization is not limited to that of this example but generally-employed various methods can be used.

Also, the pore size, density, and thickness of the porous silicon layer can controlled over a wide range depending on the composition of the anodization solution, the anodization current, the conduction type of the substrate, and the conductivity thereof. Also, platinum having an extremely high resistance to hydrofluoric acid or a metal covered with platinum on its surface is used as an electrode. In the case of collectively anodizing the plural wafers into porous layers, as shown in FIG. 14, the anodization solution itself in contact with both surfaces of the wafer acts as an electrode. This enables uniform contact and enhances controllability of a porous layer to be formed.

In a subsequent step, i.e. step (3) of FIG. 1C, epitaxial growth of silicon is allowed to proceed starting with a silicon surface constituting the surface of the porous silicon layer 102 formed in step (2). In this way, an epitaxial growth silicon layer 103 is formed. The epitaxial growth silicon layer 103 has a thickness about twice larger than that of the porous layer but, as described later, is precisely controlled depending on the thickness ratio (duty) between the silicon layer and the porous silicon layer in the multilayered film.

As for the epitaxial growth, it is well known that the porous layer formed with the above method maintains a crystal orientation of a single-crystal substrate, and a uniform, pore-free single crystal layer can be formed thereon through epitaxial growth.

A description will be given of conditions for forming the epitaxial growth Si layer 103 by chemical vapor deposition (CVD) etc. through the epitaxial growth on the porous Si layer 102. First, it is important to effect the epitaxial growth in a hydrogen atmosphere. It promotes sealing of the pores on the porous layer surface and enables the formation of a high-quality epitaxial layer thereon (Yonehara et al., "Appl. Phys. Lett.", Collective Report, September, 2002).

Epitaxial growth conditions are listed below:
Vapor deposition Temperature: 1,000° C.
Gas: $SiH_4/H_2$
Pressure: 700 Torr In a subsequent step, i.e. step (4) of FIG. 1D, the surface of the epitaxial growth silicon layer 103 formed in step (3) is made porous through the anodization. Note that the anodization is only allowed to proceed up to a given thickness from the surface; in short, part of the epitaxial growth silicon layer remains. The thicknesses of the epitaxial growth silicon layer and porous layer are designed according to a target optical element, and a light wavelength or light incident angle distribution, and may be changed for each layer. Here, the design is basically made in consideration of the refractive index of the silicon layer and the refractive index depending on the porosity of the porous silicon layer. Assuming that the refractive index of silicon is 3.5, the effective refractive index of porous silicon is 2.5, and the light wavelength adopted is 1.5 µm, a typical layer thickness is such that the optical path length in each layer, i.e. the length derived by multiplying the refractive index by the layer thickness, equals ¼ of the light wavelength, leading to the condition that the silicon layer is 0.1 µm in thickness, and the porous silicon layer is 0.15 µm in thickness.

As a subsequent step, if the processes of steps (3) and (4) are further repeatedly carried out on the structure completed up to step (4) in this way, and one epitaxial growth silicon layer and one porous silicon layer are added in one cycle, a multilayered film structure 105 is obtained (FIG. 1E).

The multilayered film structure 105 is made up of a multilayered film including silicon and porous silicon and has such an advantage that a difference in refractive index between layers can be increased as compared with a conventional multilayered film where the porosity of porous silicon is modulated. Hence, in manufacturing a high-reflectance mirror or Fabry-Perot resonator using the multilayered film, it is possible to reduce the number of layers and realize reduction in size of an element and in cost for a high-cost laminated structure obtained through epitaxial growth. Also, in the multilayered film structure 105 realized with the manufacturing method according to the present invention, the porous silicon can maintain crystallinity such as the crystal orientation and lead to the epitaxial growth silicon. Thus, the monolithic structure can be attained in its entirety. Unlike a polycrystalline silicon or amorphous silicon, this solves the problem that, when functioning as an optical element, light is scattered due to influence of a grain boundary etc. to hinder the realization of a high-quality optical element.

For example, if the above technique of the background art is used to manufacture the multilayered film mirror through lamination based on the epitaxial growth, basically, there can be only such a small difference in composition ratio that can be achieved through the epitaxial growth. Thus, regarding an optical element requiring a relatively high refractive index difference between layers, it is difficult to increase the refractive index difference. This means that the number of layers should be inevitably increased. However, by use of a structural difference between the porous structure and non-porous structure, as described in this example, it is unnecessary to increase the number of layers more than the above background art although depending on its application.

Example 2

Hereinafter, Example 2 of the present invention will be described with reference to FIGS. 2A to 2G.

This example relates to a monolithic multilayered film structure including silicon and porous $SiO_2$ (one-dimensional photonic crystal), and a manufacturing method therefor.

A method of forming the multilayered film structure according to this example is explained with reference to FIGS. 2A to 2G. In a first step (step (1)), as shown in FIG. 2A, a porous silicon layer 202 is formed on the surface of a Si substrate 201 (single-crystal substrate obtained through crystal growth by a Czochralski method etc.) through anodization as shown in FIG. 2B (step (2)).

In a subsequent step, i.e., step (3) of FIG. 2C, heating is conducted while supplying $H_2O$ or $O_2$ and other such gases (i.e. thermal oxidation), thereby turning the porous silicon layer into a porous $SiO_2$ layer 203.

For the porous silicon of the present invention with a pore size of 10 nm or smaller, the thermal oxidation proceeds in an inner portion of the porous silicon faster than the surface thereof. The thermal oxidation is stopped with the thin silicon layer being left on the surface. Hence, a starting point of the epitaxial growth of silicon in the next step can be left. It is not always necessary to completely oxidize the inner portion of the porous silicon layer depending on circumstances. This is because the porous structure of the present invention is a microstructure that does not optically scatter light, so the inner portion of $SiO_2$ and silicon only influences optical characteristics on average. Thus, intended reduction in refractive index through oxidization of silicon into $SiO_2$, i.e. increase in refractive index difference with the epitaxial growth silicon layer can be realized enough even if the porous structure is not completely turned into $SiO_2$ with the silicon being partly left.

In a subsequent step, i.e. step (4) of FIG. 2D, $SiO_2$ of the surface of the porous $SiO_2$ layer formed in step (3) is etched off with an HF solution etc. As a result, as mentioned above, the silicon layer that remained without being thermally oxidized is exposed on the surface, after which epitaxial growth of silicon is allowed to proceed using the silicon surface of the surface as a starting point to form an epitaxial growth silicon layer 204. The epitaxial growth silicon layer 204 has a thickness about twice larger than that of the porous layer but, as described later, is precisely controlled depending on the thickness ratio (duty) between the silicon layer and the porous silicon layer in the multilayered film.

In a subsequent step, i.e. step (5) of FIG. 2E, the surface of the epitaxial growth silicon layer 204 formed in step (4) is turned into porous silicon (205) through the anodization. Note that the anodization is allowed to proceed up to a given thickness from the surface; in short, part of the epitaxial growth silicon layer remains. The thicknesses of the epitaxial growth silicon layer and porous layer are designed according to a target optical element, and a light wavelength or light incident angle distribution, and may be changed for each layer. Here, the design is basically made in consideration of the refractive index of the silicon layer and the refractive index according to the porosity of the porous silicon layer. Assuming that a refractive index of silicon is 3.5, an effective refractive index of porous silicon is 2.5, and a light wavelength adopted is 1.5 µm, a typical layer thickness is such that an optical path length in each layer, i.e. a length derived by multiplying the refractive index by the layer thickness equals ¼ of light wavelength, leading to the condition that the silicon layer thickness is 0.1 µm and the porous silicon layer thickness is 0.15 µm.

In a subsequent step, step (6) of FIG. 2F, as in step (3), the epitaxial growth silicon layer 205 made porous is turned into a porous $SiO_2$ layer 206 through thermal oxidation.

As a subsequent step, the processes of steps (4) to (6) are further repeatedly carried out on the structure completed up to step (6) in this way, so that one epitaxial growth silicon layer and one porous silicon layer are added in one cycle. As a result, a multilayered film structure 207 including the porous SiO$_2$ layer and the epitaxial growth silicon layer is obtained (FIG. 2G).

The multilayered film structure 207 is made up of a multilayered film including silicon and porous SiO$_2$ and has such an advantage that a difference in refractive index between layers can be further increased without increasing the porosity as compared with a conventional multilayered film where a porosity of porous silicon is modulated. Hence, upon manufacturing a high-reflectance mirror or Fabry-Perot resonator using such a multilayered film, it is possible to reduce the number of layers and realize reduction in size of an element and in cost for a high-cost laminated structure obtained through epitaxial growth.

Example 3

Hereinafter, Example 3 of the present invention will be described with reference to FIGS. 3A to 3D.

This example relates to a monolithic three-dimensional structure (three-dimensional photonic crystal) where a multilayered film structure including silicon and porous silicon or porous SiO$_2$ has a pattern in an in-plane direction, and a manufacturing method therefor.

This example uses, as a starting point (starting structure), the multilayered film structure (denoted by '105' in FIG. 1E) manufactured by using the method according to the present invention, for example, the method of Example 1 above. As schematically shown in a sectional view and top view of FIGS. 3A and 3B, respectively, a photonic crystal pattern such as a triangular lattice pattern is formed through photolithography and ICP dry etching in a direction vertical to the film surface of the multilayered film structure so as to pass through plural layers of the multilayered film (step (1)).

For patterning for forming a through-hole pattern, various methods such as electron beam (EB) lithography, near-field photolithography, X-ray lithography, and ion beam lithography can be used as appropriate aside from the photolithography. It is needless to say that an optimum etching method, e.g. ECR or other such methods, can be used for etching aside from ICP etching, according to various conditions.

Through this step (1), an in-plane pattern is added to the one-dimensional periodic structure, offering a three-dimensional photonic crystal. In short, the periodic structure is formed in the direction vertical to the surface by the utilization of the refractive index difference between the epitaxial growth silicon layer and the porous silicon layer, while the periodic structure is formed in the in-plane direction by the utilization of the refractive index difference between the air in the through-hole and the silicon layer or the porous silicon layer.

Figure 3A:
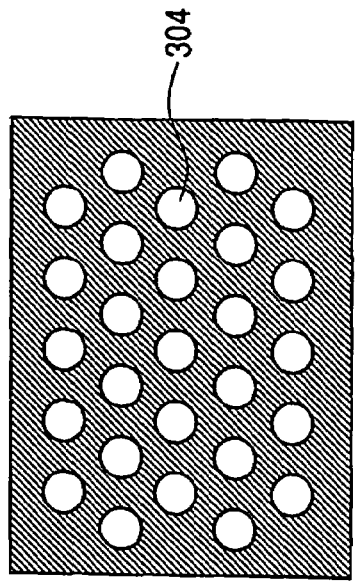
FIGS. 3A, 3B, 3C and 3D are schematic diagrams each showing a structure example of a three-dimensional photonic crystal according to Example 3 of the present invention.
Figure 3B:
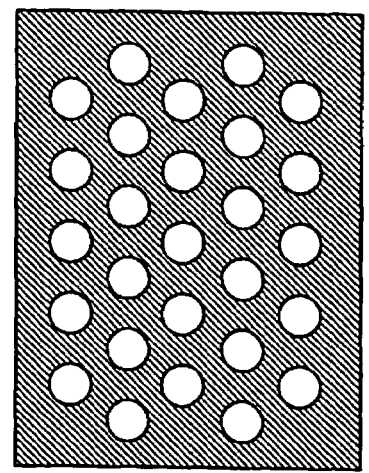
Figure 3C:
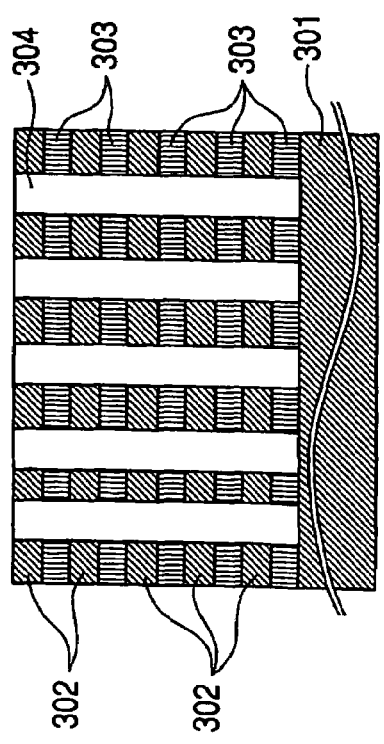
Figure 3D:
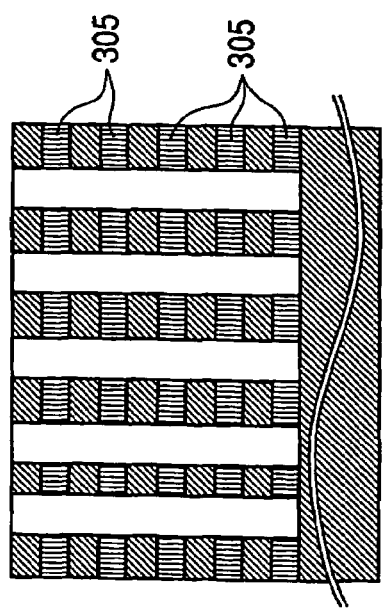

In order to increase the refractive index difference in the three-dimensional periodic structure, the following step (2) shown in FIGS. 3C and 3D can be additionally performed.

In step (2), thermal oxidation is promoted under heating while a gas as a source of oxygen atoms, such as O$_2$ or H$_2$O, is caused to flow through the through-hole formed in step (1). The thermal oxidation becomes a so-called accelerated oxidization due to an effect of a porous structure in the porous silicon layer, and allows oxidization at a rate about 100 times higher than that of the epitaxial growth silicon layer. Hence, the entire porous layer can be oxidized even in such a short period as to oxidize just the surface of the epitaxial growth silicon layer. Thus, the three-dimensional structure of this example includes the epitaxial growth silicon and the porous SiO$_2$ in the thickness direction, making it possible to increase a refractive index difference in the thickness direction. This enables reduction in the number of layers necessary for attaining the same effect, and reduction in size of the element and cost for the high-cost laminated structure obtained through epitaxial growth.

Example 4

Hereinafter, Example 4 of the present invention will be described with reference to FIGS. 4A to 4E.

This example relates to a monolithic three-dimensional structure (three-dimensional photonic crystal) where a multilayered film structure including silicon and porous silicon or porous SiO$_2$ has in-plane patterns different from one layer to another layer, and a manufacturing method therefor.

Figure 4A:
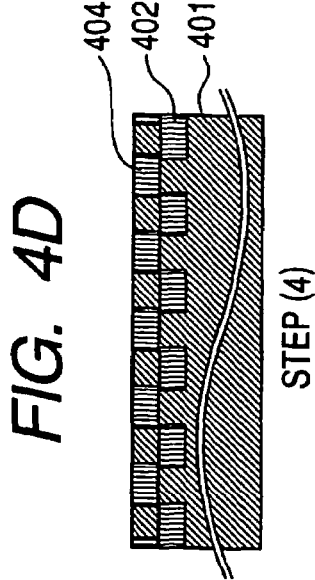
FIGS. 4A, 4B, 4C, 4D, and 4E are schematic diagrams each showing a structure example of a three-dimensional photonic crystal according to Example 4 of the present invention.
Figure 4D:
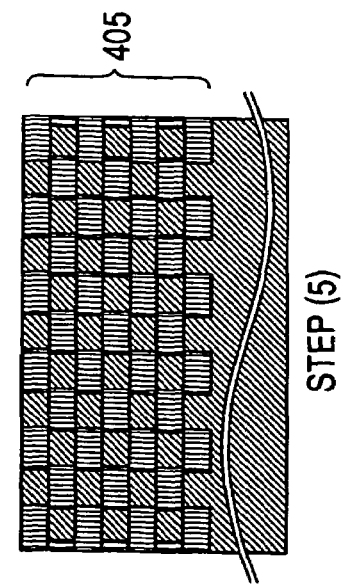
Figure 4B:
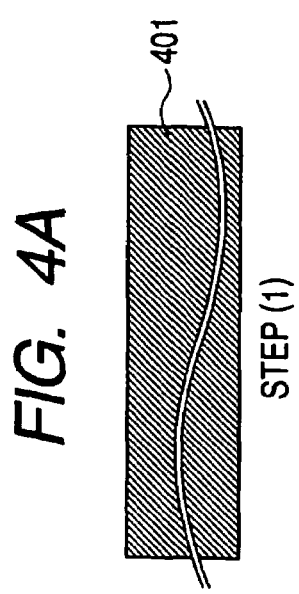

In FIG. 4A, first, a silicon substrate 401 is prepared, and a porous silicon portion 402 is formed with a given in-plane pattern through anodization in step (2) (FIG. 4B).

FIGS. 5A to 5G are referenced to describe an example of a method of patterning the porous silicon layer through anodization.

First of all, as an example A, as shown in FIG. 5A, a silicon substrate is prepared in step (A1). Then, as shown in FIG. 5B, a resist is applied onto the silicon surface in step (A2), followed by patterning of the resist through a photolithographic technique. The pattern is formed so as to outline a portion to be anodized. In step (A3), an electric field is applied in an HF solution with the resist pattern being left thereon for anodization, with the result that the silicon surface covered with the resist is insulated and protected against the injection of carriers and intrusion of the HF solution, and hence is not made porous through anodization (FIG. 5C). Accordingly, only portions not covered with the resist are made porous. After the resist is removed in step (A4), the silicon substrate is obtained where the porous portions are patterned (FIG. 5D).

Next, as an example B, in step (B2) of FIG. 5F where anodization is performed in the HF solution on the silicon substrate prepared in step B1 as shown in FIG. 5E, unlike the general method of arranging a mesh electrode apart from the substrate and uniformly applying an electric field in an in-plane direction of the substrate as shown in FIG. 13, such a structure is used that a microelectrode is provided in the vicinity of a pole of the substrate and an electric field intensity varies in an in-plane direction. In other words, anodization proceeds in only portions applied with a high-intensity electric field to make the portions porous. In addition to patterning through local application of the electric field, the light may be locally applied to generate photocarriers, and the photocarriers may serve to locally promote the anodization.

For resist patterning for anodization, various methods such as electron beam (EB) lithography, near-field photolithography, X-ray lithography, and ion beam lithography can be used as appropriate aside from the photolithography.

Figure 6A:
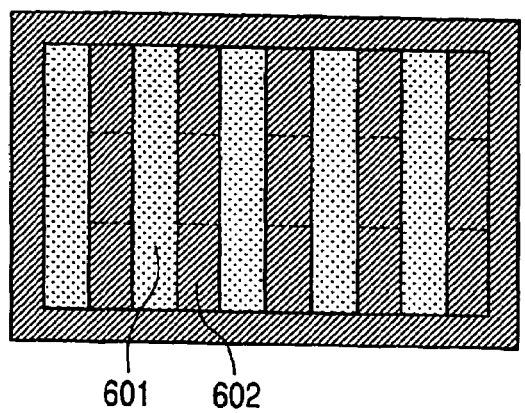
FIGS. 6A, 6B, 6C and 6D are schematic diagrams each showing a structural example (top view) of a pattern in each layer according to Example 4 of the present invention.

The pattern of the porous silicon in this example may be set to a pattern A shown in FIG. 6A. For example, in FIG. 6A, the porous portion is denoted by '601'. Regarding the size of pattern A, the light wavelength adopted is set to 1.5 µm, the layer thickness is set to about 0.25 µm, and the pattern cycle is set to about 0.7 µm. Note that the size corresponds to about ½ to ¼ of the above respective values in the case of using a visible light, for example, but the same structure can be used without any change.

Figure 4E:
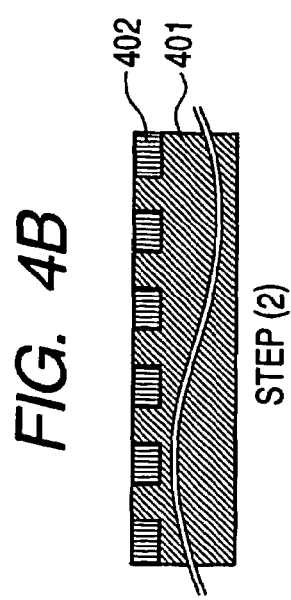
Figure 4C:
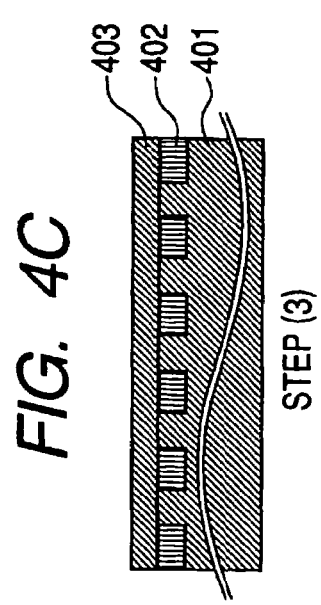

Next, in FIG. 4C, the epitaxial growth is allowed to proceed starting from the surface made of the porous silicon and silicon to form a silicon layer 403 in step (3). The thickness of the silicon layer is set equal to the thickness of the porous silicon layer formed in step (2) (about 0.25 µm), but may be set to an optimum thickness according to various conditions such as its applications, porosities, and in-plane patterns.

Figure 6B:
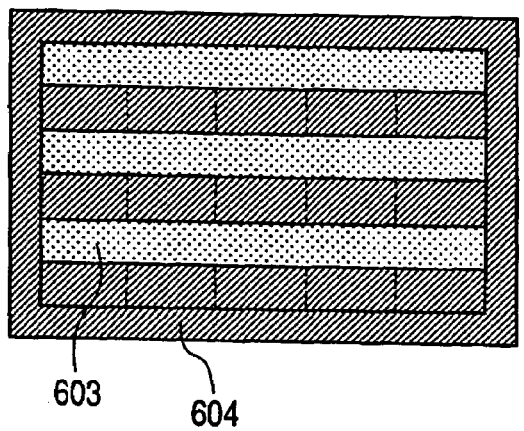
Figure 6C:
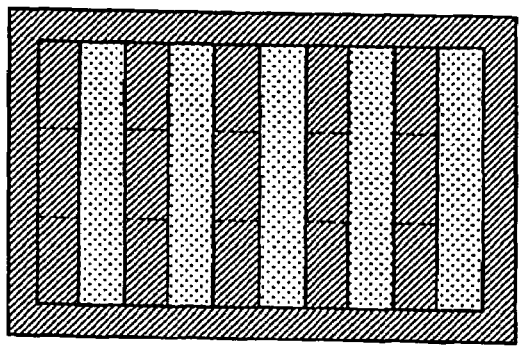
Figure 6D:
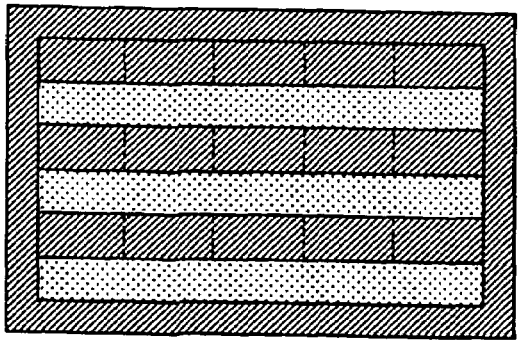

Next, in step (4) of FIG. 4D, the porous silicon layer is formed by subjecting to the in-plane patterning the epitaxial growth silicon layer formed in step (3) through the anodization. Note that as for patterning in this step (4), a pattern B shown in FIG. 6B is formed with a different shape from the pattern in step (2). The porous portion is denoted by '603' as in the pattern A.

Figure 7:
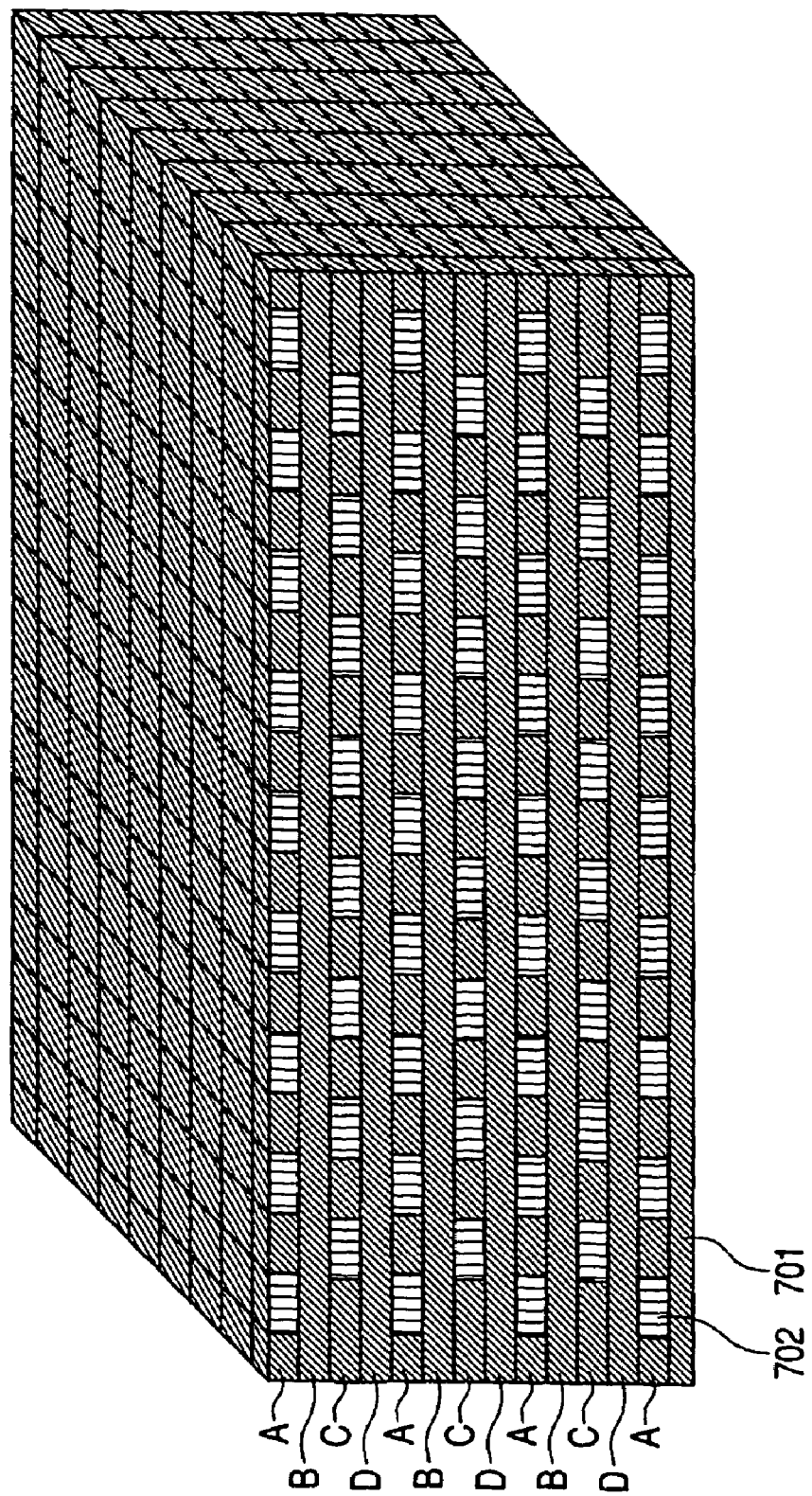
FIG. 7 is a schematic diagram showing a structural example (sectional view, bird's-eye view) of a pattern in each layer according to Example 4 of the present invention.
Figure 8A:
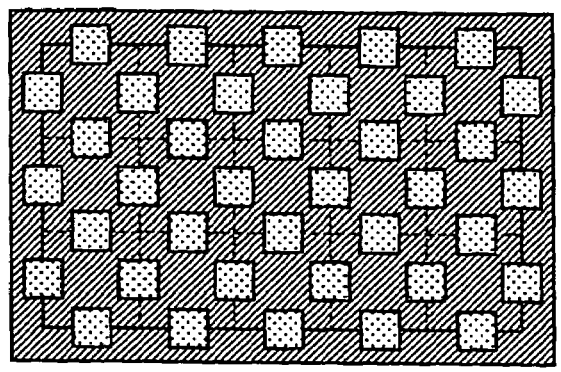
FIGS. 8A, 8B, 8C and 8D are schematic diagrams each showing another structural example (top view) of the pattern in each layer according to Example 4 of the present invention.
Figure 8B:
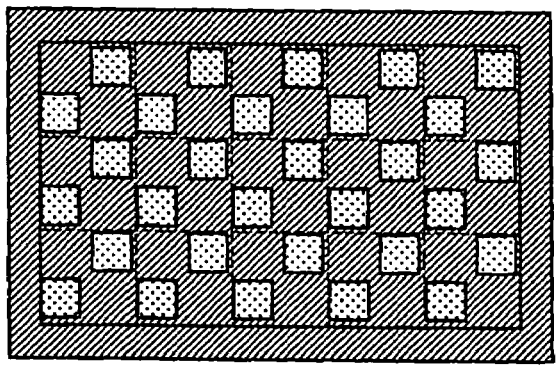
Figure 8C:
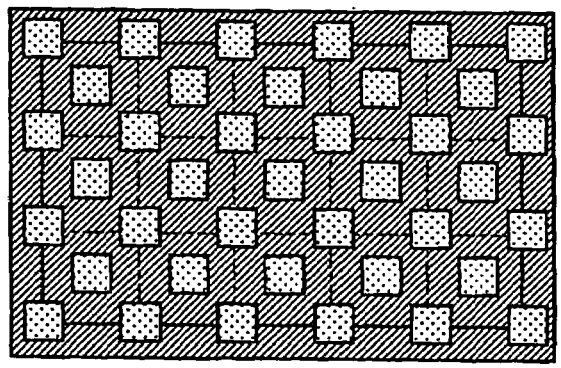
Figure 8D:
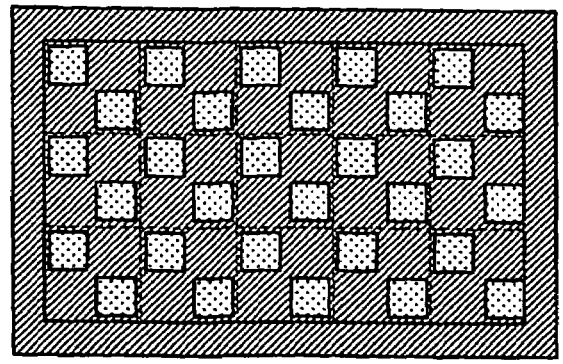

Next, in step (5) shown in FIG. 4E, steps (2) to (4) are further repeatedly performed to afford a laminated structure including multiple layers with an in-plane pattern of the porous silicon portion. For example, the layers are laminated to a given number of layers necessary in terms of optical performance for the photonic crystal, offering a three-dimensional photonic crystal structure. Here, with regard to the patterns of the respective epitaxial growth silicon layers repeatedly formed, patterns of FIGS. 6A to 6D are laminated in the order of, for example, A, B, C, D, A, B, . . . with reference to FIG. 7.

In general, the number of layers necessary for light-confinement control utilizing the photonic band gap is, for example, about eight. For example, in the case of forming a defect at the center for light-confinement control or the like, a laminated structure of about 16 layers is necessary, in which 8 layers are provided on each side of the detect.

Further, the patterns in those layers can be designated independently of each other. It is possible to easily realize the laminated structure high in degree of freedom; for example, two types of photonic crystals different in refractive index period can be made to coexist. Thus, a high-performance optical element and system can be attained three-dimensionally.

Figure 9:
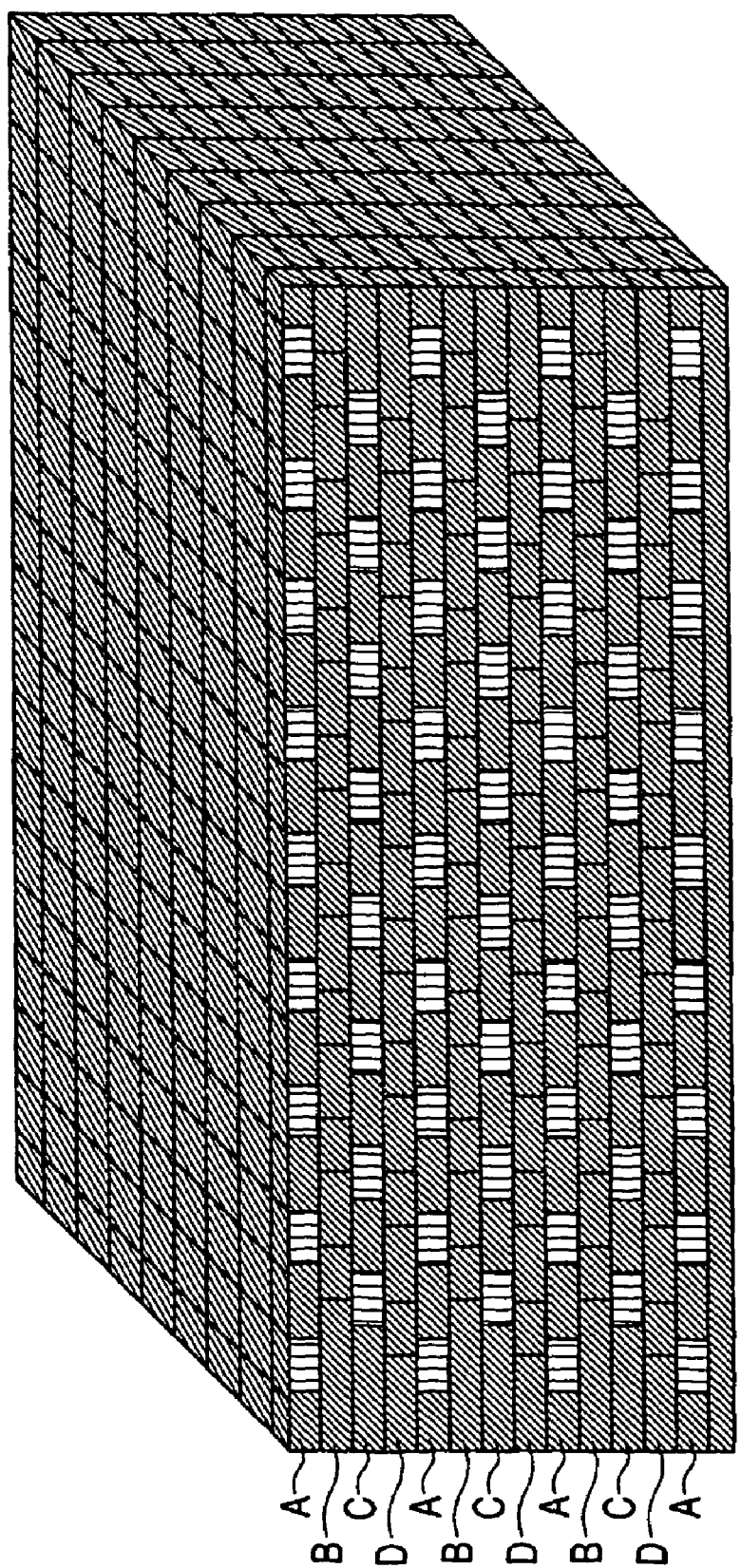
FIG. 9 is a schematic diagram showing another structural example (sectional view, bird's-eye view) of the pattern in each layer according to Example 4 of the present invention.
Figure 10A:
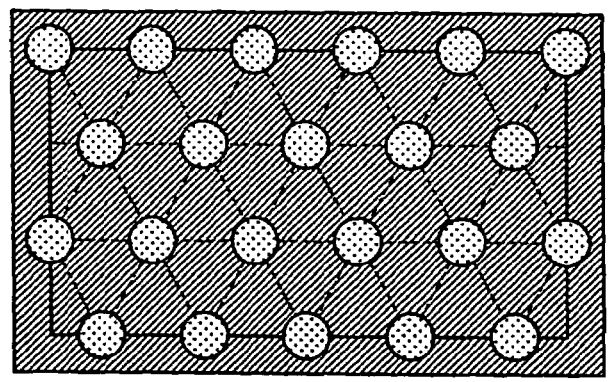
FIGS. 10A, 10B and 10C are schematic diagrams each showing another structural example (top view) of the pattern in each layer according to Example 4 of the present invention.
Figure 10B:
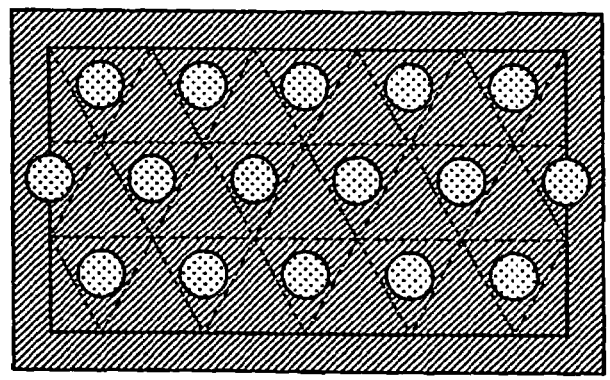
Figure 10C:
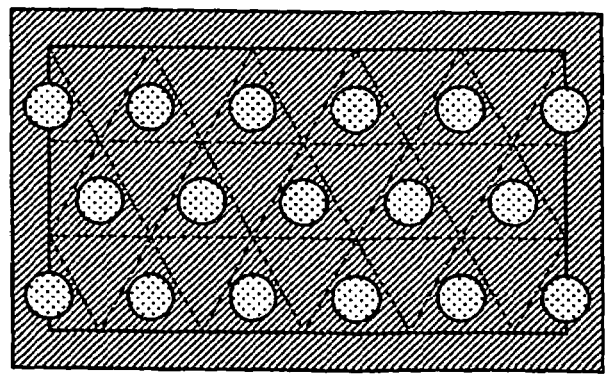
Figure 11:
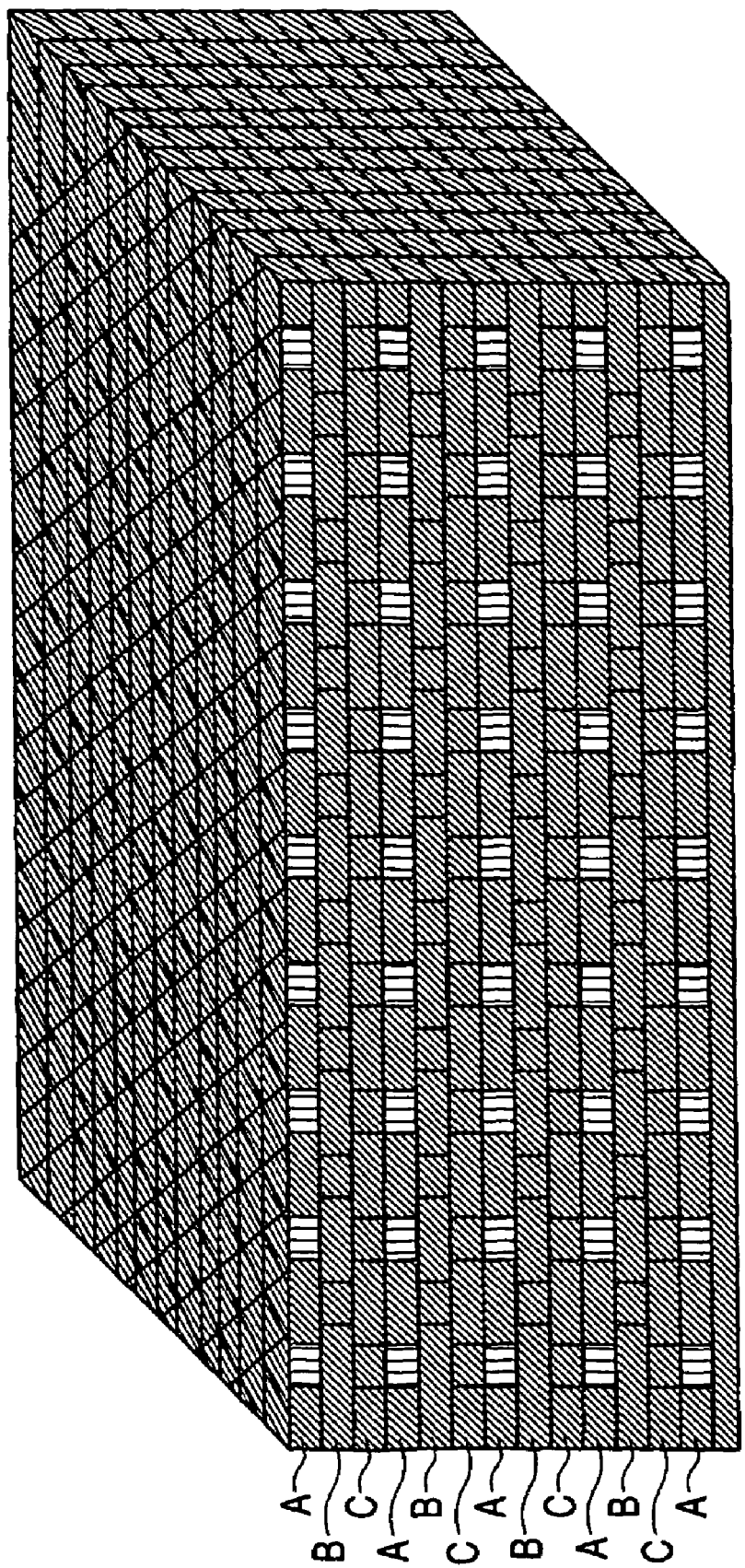
FIG. 11 is a schematic diagram showing another structural example (sectional view, bird's-eye view) of the pattern in each layer according to Example 4 of the present invention.

Note that pattern groups A to D of the respective layers shown in FIGS. 6A to 6D in this example can be changed in various forms in consideration of their purposes, materials, patterning devices, etc. as appropriate. Thus, various laminated structures can be formed; for example, the respective layers with patterns A to D as shown in FIGS. 8A to 8D are laminated into a laminated structure of FIG. 9, which is a diamond-like structure with a rectangular lattice form, and patterns A to C of FIGS. 10A to 10C are laminated into a periodic structure with a cylindrical triangular lattice form as shown in FIG. 11. In addition, the hole of the pattern is deviated from the periodic position, the hole size is changed, or the hole is locally eliminated, so positions of the defective structures may be designated three-dimensionally in the periodic refractive index profile pattern to form the laminated structure with ease.

Also, in the above description, the adjacent layers in the laminated structure may have different patterns. In practice, the respective layers may have patterns different only in translational deviation in many cases. Also, layers having no in-plane patterns may be laminated according to its application and design.

Figure 12A:
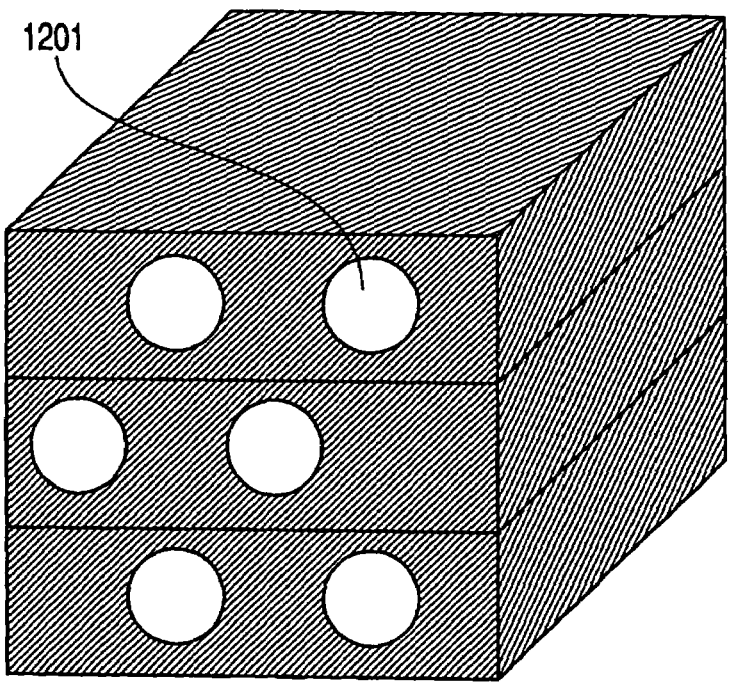
FIGS. 12A and 12B are schematic diagrams each showing an example of approximating a curved member with multiple thin-film structures according to Example 4 of the present invention.
Figure 12B:
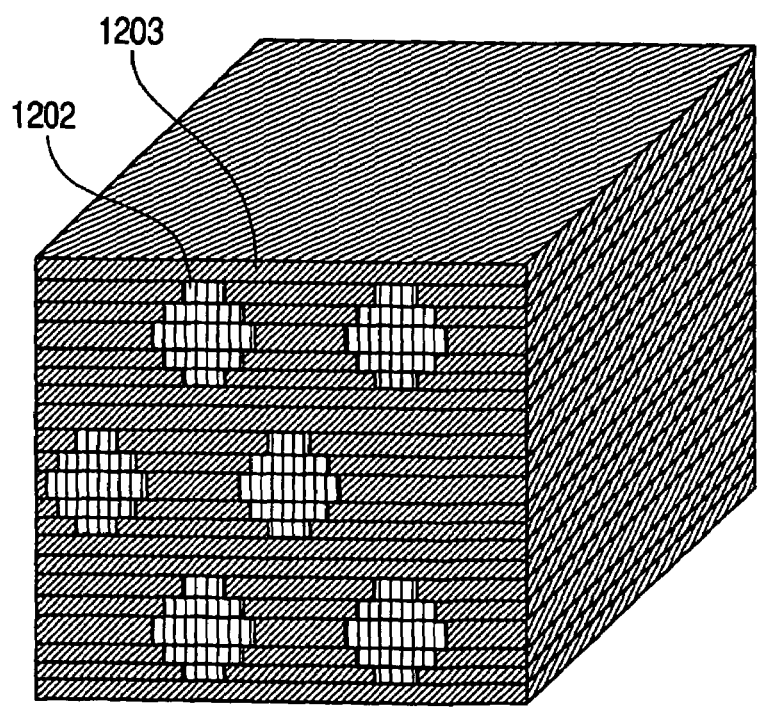

Further, with the method of the present invention, it is possible to reduce the thickness of each layer to 1 nm to 10 nm. By making use of its advantage, one unit of the refractive index profile of the photonic crystal in the lamination direction is formed with plural epitaxial growth silicon layers, so the structure in terms of the layer thickness direction can be changed within the one unit of the refractive index profile. FIGS. 12A and 12B show an example thereof. Here, the pattern structure in one layer shown in FIG. 12A is obtained by laminating plural layers with the patterns being changed as shown in FIG. 12B. More specifically, in the case of forming the spherical or cylindrical structure, as shown in FIG. 12B, the structure can be replaced by the approximate multilayered film structure. Thus, given patterns are formed in the respective thin-film layers to be laminated, thereby producing the approximate form. The thickness of the thin film can be set to 1 nm to 10 nm as mentioned above, so that in the case of forming an approximate structure of the spherical structure having a diameter of 200 nm with the laminated structure, twenty layers of 10 nm-thick thin films are laminated to obtain the approximate structure with accuracy.

Figure 19:
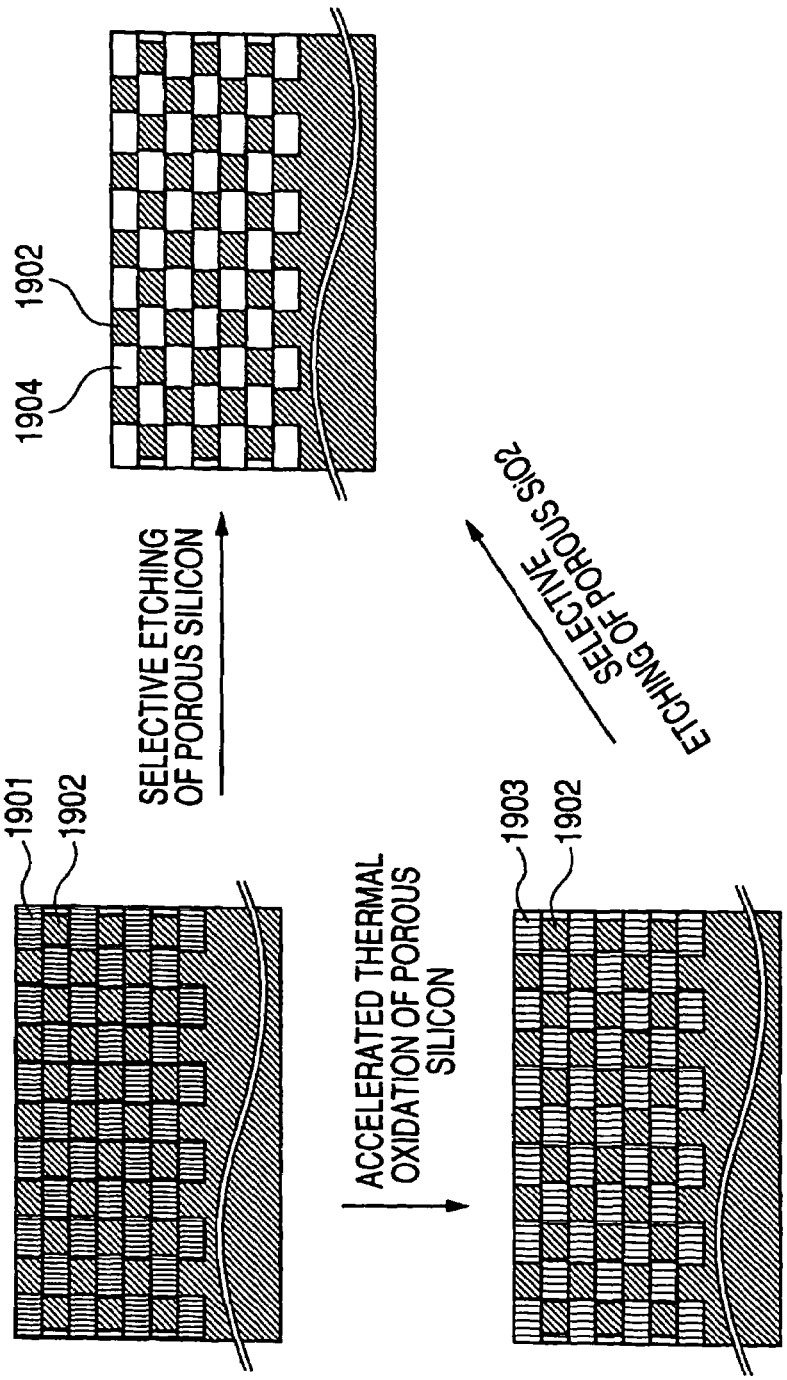
FIGS. 19A, 19B and 19C are schematic diagrams each showing an example of a three-dimensional photonic crystal according to Example 4 of the present invention.

Also, as for the three-dimensional photonic crystal produced by using the porous silicon or porous $SiO_2$ and epitaxial growth silicon of this example shown in FIG. 19A, the accelerated oxidation described in the above example may be used to make the porous silicon into porous $SiO_2$. Thus, the three-dimensional photonic crystal including the porous $SiO_2$ and the epitaxial growth silicon can be manufactured (FIG. 19B).

In addition, as for the three-dimensional photonic crystal produced by using the porous silicon or porous $SiO_2$, and the epitaxial growth silicon of this example, the porous silicon or porous $SiO_2$ is selectively etched relative to the epitaxial growth silicon, making it possible to manufacture the three-dimensional photonic crystal including the air and the epitaxial growth silicon (FIG. 19C).

The selective etching conditions for the porous layer are listed below by way of example:

Etching Condition:
Solution: $HF/H_2O_2$
Etching selection ratio:crystal layer:porous layer=1:100,000

Figure 16:
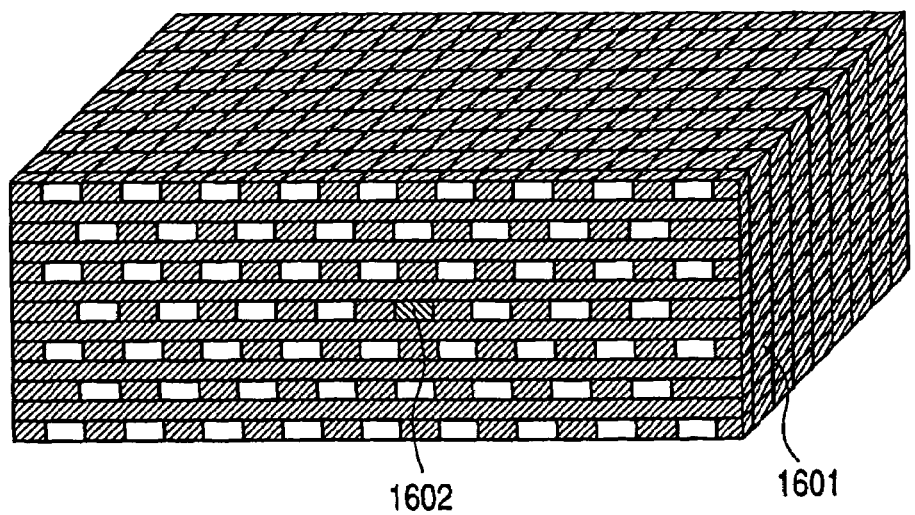
FIG. 16 is a schematic diagram showing another structure example of the photonic crystal laser according to Example 5 of the present invention.

In this case, as shown in FIG. 16, hydrogen annealing may be additionally carried out after etching. Thus, the surface of the epitaxial growth silicon after etching can be made smooth up to an atomic level, improving a performance of the crystal as an optical element. Annealing conditions are listed below by way of example.

Annealing Condition:
Gas: 100% $H_2$
Temperature: 1,050° C.

Example 5

Hereinafter, Example 5 (PC laser) of the present invention will be described with reference to the accompanying drawings. This example relates to an example where a laser device is composed by using the one- or three-dimensional photonic crystal manufactured by the method of the present invention.

Figure 15A:
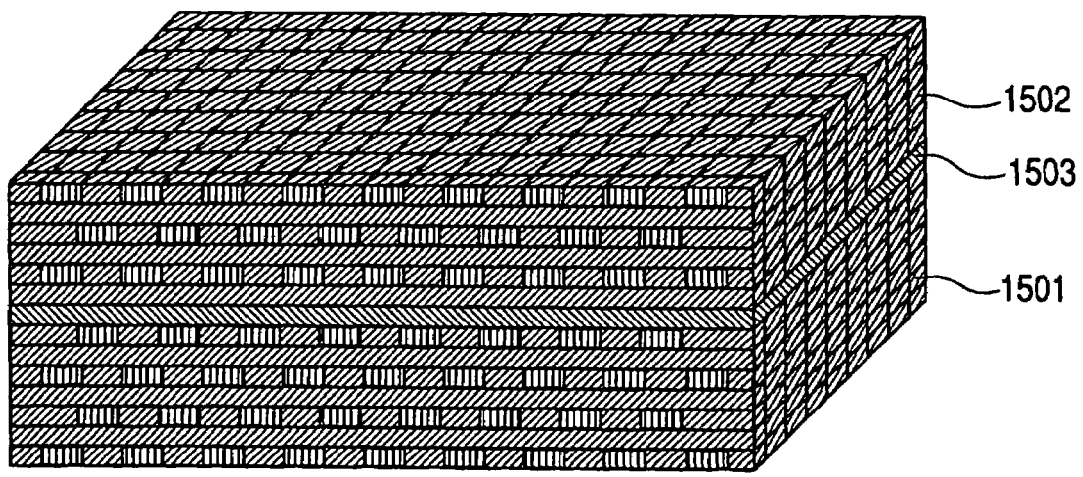
FIGS. 15A and 15B are schematic diagrams each showing a structure example of a photonic crystal laser according to Example 5 of the present invention.

FIG. 15A is a schematic diagram showing a photonic crystal laser where a laser medium layer 1503 is formed in a planer form. In FIG. 15A, the laser medium layer 1503 is interposed between a lower three-dimensional photonic crystal 1501 and an upper three-dimensional photonic crystal 1502.

There are two processes adaptable to such arrangement, that is, (1) a process for laminating the layers in order from the lower photonic crystal using the method described in Example 4 above in which the laser medium layer 1503 is also regularly laminated through epitaxial growth etc., and (2) a process for manufacturing the upper and lower photonic crystals in advance by the method of Example 4 and then combining the photonic crystals with the laser medium layer 1503. At this time, the periodic structure, or the periodic structure and defective structure can be formed by patterning the laser medium layer 1503 itself.

Figure 15B:
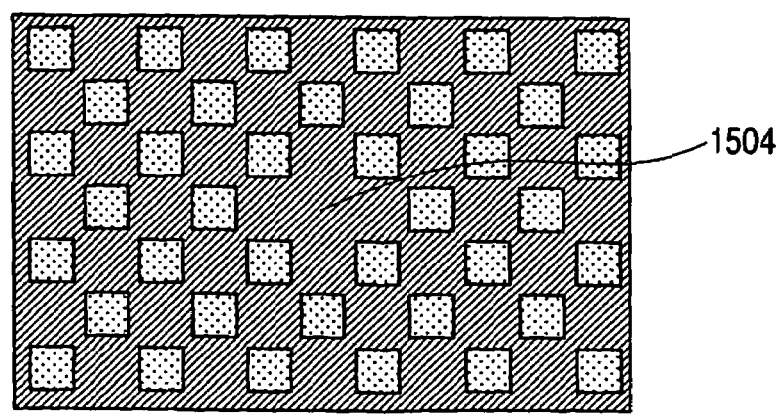

In the laser medium layer 1503, a current injection wiring (not shown) or photoexcitation optical system is arranged. Based on the principle of laser, laser oscillation is generated with the upper photonic crystal 1501 and the lower photonic crystal 1502 used as a resonator, i.e. band-narrowing elements. The laser oscillation mode is of an oscillation mode of the DFB type, i.e. an oscillation mode of the so-called photonic band-edge type, in the case of a periodic structure where the upper photonic crystal 1501 and the lower photonic crystal 1502 have no defects introduced therein. As a result, the mode involves relatively wide spatial divergence, in short, divergence over plural periods of the photonic crystal. Also, in adjacent layers next to the laser medium layer 1503 of the upper photonic crystal 1501 and the lower photonic crystal 1502, as shown in FIG. 15B, a defect 1504 may be introduced. In this case, as a whole, the laser resonator emits light with a local mode, in short, an oscillation mode with a divergence over about one cycle of the photonic crystal.

The laser medium layer 1503 may be formed of a host material including an organic pigment such as coumarin, rhodamine, DCM, or Alq$_3$, or other pigments. A compound semiconductor containing a ternary or quaternary mixed crystal such as GaAs, InP, InGaN, InGaAs, or InGaAlP can be used according to its application. The laser medium layer may have an internal structure selected from various structures such as multiple quantum well structure and quantum dot structure as appropriate.

Further, an Er ion can be used as a laser medium as well. In this case, it is possible to locally change a portion to be implanted with Er ions into porous silicon in advance or into amorphous silicon through laser irradiation in order not to easily deactivate the Er ions even at normal temperature.

Meanwhile, as an excitation source, the following ones may be used as appropriate. That is, an electron or hole transporting material such as Alq$_3$ or TPD widely used in a so-called organic EL element may be used. Alternatively, current injection may be performed through an electrode formed of ITO, MgAg, or the like. Besides, light excitation may be induced using an N$_2$ gas laser, and Nd:YAG harmonic and blue/UV semiconductor laser. In this example, aside from the above, the laser medium 1602 is arranged in a dot shape in the three-dimensional photonic crystal 1601 to compose a dot-defect resonator as shown in FIG. 16. Note that FIG. 16 is a schematic diagram showing the section taken in the direction along the paper surface at the position at which the laser medium 1602 is arranged.

As mentioned above, the three-dimensional photonic crystal laser is realized using a technique of forming a periodic structure by repeating the anodization and epitaxial growth according to the present invention. With the three-dimensional photonic crystal resonator having a high performance and little loss, a light-emitting element can be produced, which enables oscillation with a wavelength (e.g. oscillation with a green light wavelength hardly realized with the semiconductor laser) which has been difficult so far, or oscillation with a micro mode.

Figure 17:
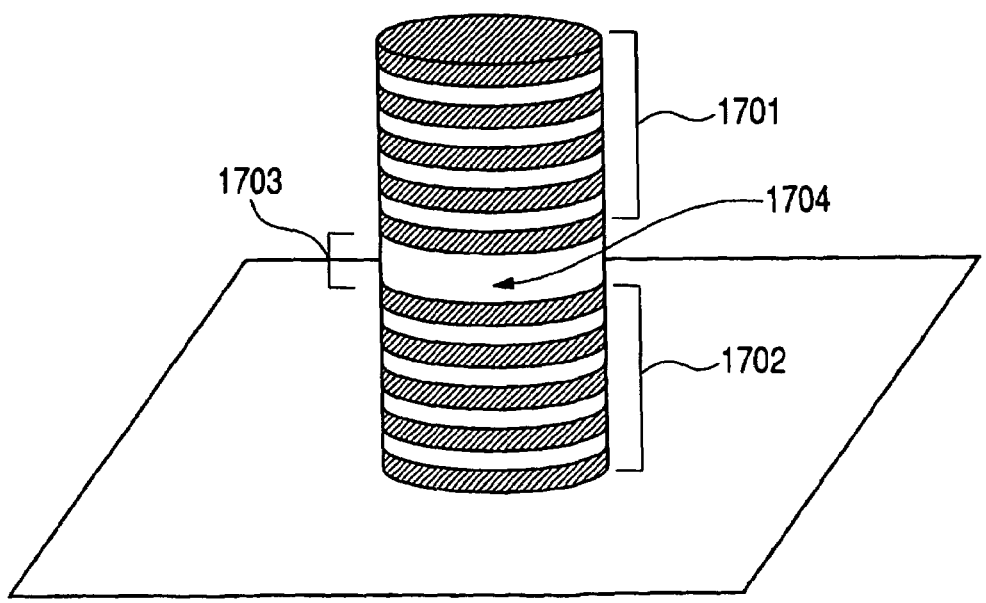
FIG. 17 is a schematic diagram showing still another structure example of the photonic crystal laser according to Example 5 of the present invention.
Figure 18:
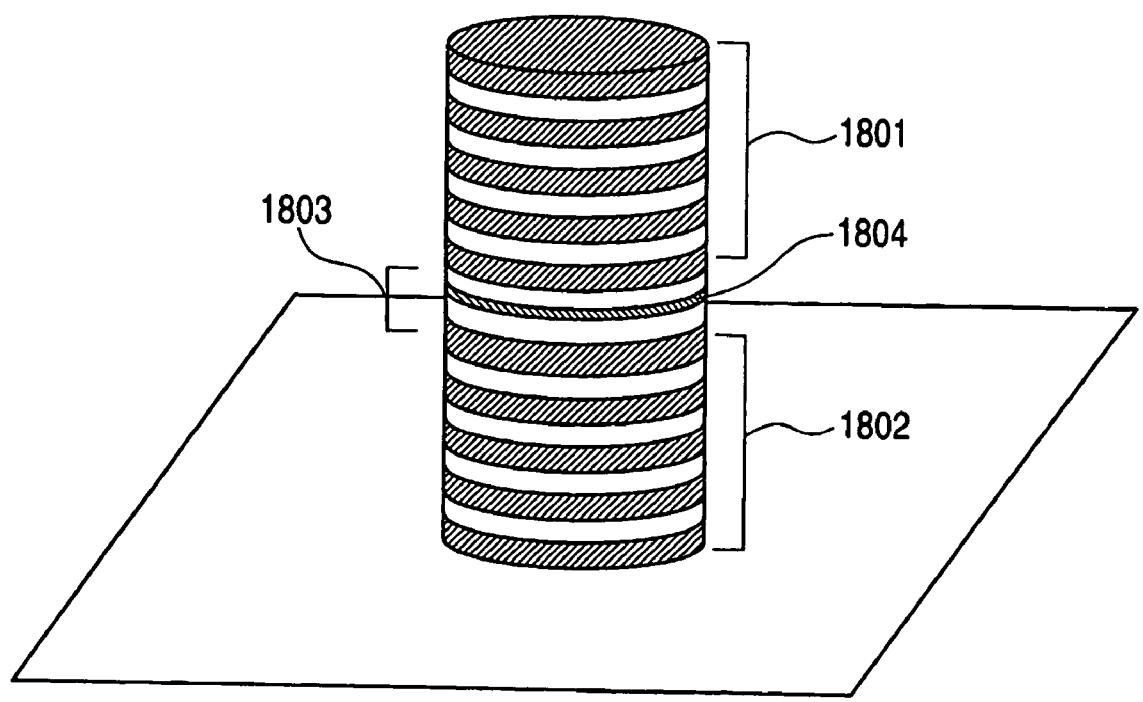
FIG. 18 is a schematic diagram showing a structure of a conventional surface emitting laser.

In the above example, the three-dimensional photonic crystal is used. However, the present invention is not limited thereto but needless to say, allows various forms, for example, a surface light emitting laser as shown in FIG. 17, which is composed by using multilayered films (1701 and 1702) made of the one-dimensional photonic crystal of Example 1 of the present invention and bonding them so as to sandwich an active layer 1703.

Further, the laser structure according to this example is, of course, used as not only a laser element but also as an optical switch with high efficiency due to a reinforcing effect resulting from the interaction between light and non-linear optical material in the photonic crystal structure of the present invention, as readily understood from the fact that the laser medium itself is a non-linear optical material.

The present invention is not limited to the examples described above, but allows various changes in sequence flows etc. without departing from the gist of the present invention.

The present invention is not particularly limited to the aforementioned silicon material but can be similarly implemented by using a III–V compound semiconductors such as GaAs, Ge, GaP, AlGaAs, InGaAs, InAs, GaInNAs, InGaP, or InP, or II–VI compound semiconductors such as ZnSe, ZnS, CdSe, or CdS, or a combination of an epitaxial growth..material and a substrate material having similar lattice constants and/or linear expansion coefficients, for example, GaAs and Ge.

Also, the principle of the present invention can be employed for a wider application range, and the present invention is not limited to substantially the periodic refractive index profile pattern but is applicable to manufacture of an optical element of a three-dimensional structure having non-periodic or random refractive index profile pattern.

As described in Examples 1 to 5 above, the following effects can be expected based on those examples.

First, with the method for manufacturing a monolithic optical which repeats anodization for forming porous structure and epitaxial growth, it is possible to offer a nanophotonic element such as a photonic crystal with a higher quality than conventional ones, in the form of laminated plural layers with a large area. Also, the entire laminated structure or part of the layers is subjected to patterning in an in-plane direction, whereby defects can be freely arranged relative to the three-dimensional optical periodic structure or three-dimensional periodic structure.

In addition, the optical element obtained with the above method is made up of a laminate of a porous layer having a relatively low refractive index depending on the porosity or a layer formed by oxidizing such porous layer to have a lower refractive index, and a crystal layer having as large a refractive index as possible. Thus, there is a large difference in refractive index between the layers. As a result, predetermined characteristics can be attained even by a relatively small number of layers. In addition, as an optical element where an optical waveguide is formed in the layer as well, the light can be readily confined within the optical waveguide. Further, the pores of the porous layer are not coupled to each other between the layers, whereby an element can be obtained with a relatively uniform crystal layer in terms of optical characteristics and little optical loss.

Example 6

Hereinafter, an optical element of this example will be described with reference to FIGS. 21A to 21C.

Figure 21A:
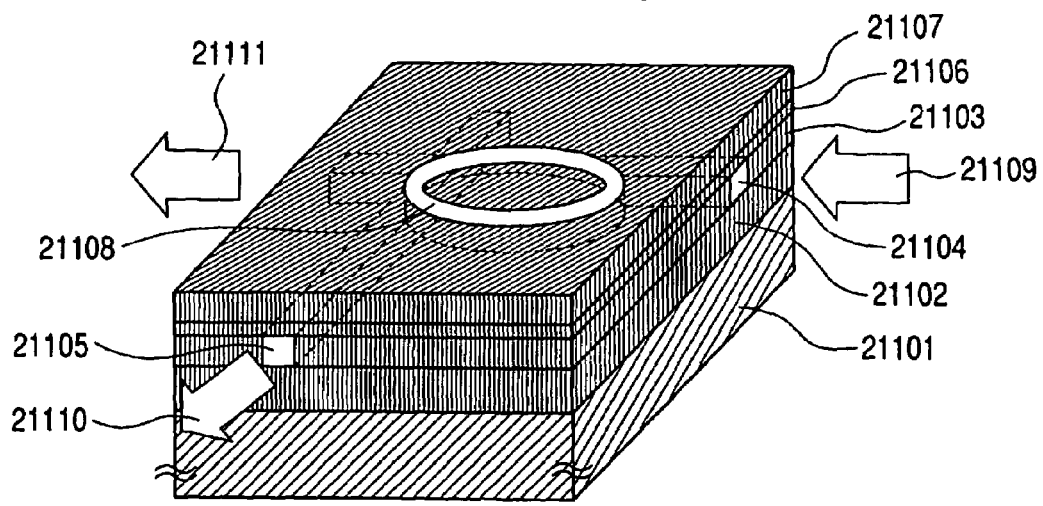
FIG. 21A is a bird's-eye view schematically showing an optical element according to Example 6 of the present invention.
Figure 21B:
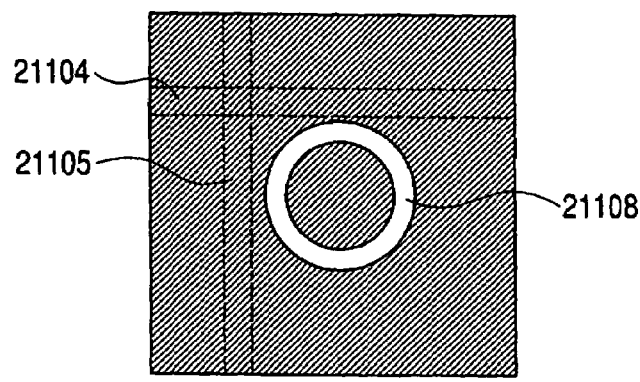
FIG. 21B is a top view thereof.
Figure 21C:
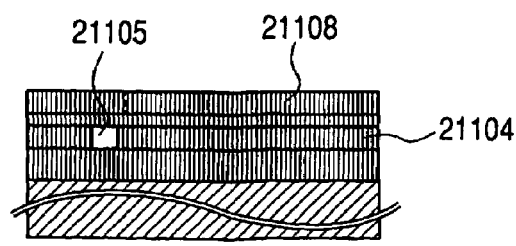
FIG. 21C is a sectional view thereof.

In FIGS. 21A to 21C, laminated on a silicon substrate 21101 is a clad layer 21102 of porous silicon maintaining its crystallinity (crystal orientation) at the boundary. A porous silicon waveguide layer 21103 which includes therein epitaxial growth silicon waveguides 21104 and 21105 intercrossing each other is laminated on the clad layer 21102.

Next, a porous silicon spacer layer 21106 which adjusts the coupling strength between the waveguide and resonator is laminated thereon. A porous silicon resonator layer 21107 which includes therein a microring resonator 21108 of epitaxial growth silicon is further laminated thereon. In this way, a three-dimensional element structure is formed.

Next, functions of this optical element are described. This optical element is such that a wavelength filter is made up of a waveguide circuit. In other words, it is of such an element that selective optical coupling in the two waveguides 21104 and 21105 is carried out. In this case, meant by the "selective coupling" is, so to say a selectivity depending on the wavelength. For example, when plural lights having different wavelengths are guided into the waveguide 21104, a light having a given wavelength is only allowed to couple to the waveguide 21105, and light energy is transferred from the waveguide 21104 to the waveguide 21105. As a result, the light having the given wavelength is emitted from the waveguide 21105, while the other lights having other wavelengths are not coupled to the waveguide 21105 and thus travels along the waveguide 21104 to be emitted.

The microring resonator is responsible for the wavelength selectivity. The microring resonator has such a property that light is guided to cause revolution, and the resonator is firmly coupled to the light having such a wavelength as to meet conditions that light having made N revolutions and light having made (N+1) revolutions (where N is an integer) have phases matched with each other to mutually enhance light intensity.

Actual conditions for coupling the waveguides 21104 and 21105 and the resonator 21108, and wavelength selection conditions are determined according to various parameters such as the configuration (distance) between the resonator and waveguides inclusive of the thickness of the spacer layer, the refractive index of the spacer layer, and the spatial confinement mode inclusive of the amplitude profile of a light penetrating to a clad out of the lights propagating in the waveguide or resonator.

Also, for such element where the waveguide is coupled through the resonator, the smaller the loss of the resonator, the higher the wavelength selectivity of the resonator. Accordingly, as one feature thereof, the narrow-band wavelength selection filter can be realized. As another feature thereof, the transmission band interval is widened by reducing the diameter of the resonator, enhancing the wavelength selectivity in a broad sense.

Next, the respective layers are described regarding their structure parameters and physical properties.

First, the silicon substrate 21101 is composed of a single-crystal silicon formed through crystal growth by the Czochralski method etc., which, for example, has a refractive index of about 3.5 with respect to a light having a wavelength of 1.5 μm.

Next, the clad layer is formed with a thickness of about 1 μm. The clad layer is formed of porous silicon with its pore size far smaller than the light wavelength adopted. For example, the clad layer is formed so as to have a pore size equivalent to about 1/100 of the light wavelength adopted. This structure prevents anisotropic scattering or diffraction of light but influences only average optical properties. In this example, the clad layer is formed for the light wavelength of 1.5 μm. The pore size is set to about 2 nm. On the other hand, the porosity in this example is about 80%. In other words, it is formed such that the volume ratio between the silicon and the air is about 2:8.

In this case, the average effective refractive index of the porous silicon layer is calculated roughly based on the following expression (1) and found to be about 1.5.

$$n_{\mathit{eff}} = n_{air} \times x_{air} + n_{si} \times x_{si} \qquad (1)$$

where $n_{\mathit{eff}}$ represents an effective refractive index, $n_{air}$ represents a refractive index of the air filled in the pore, $x_{air}$ represents a porosity, $n_{si}$ represents a refractive index of silicon, and $x_{si}$ represents a volume ratio of silicon and equals $(1-x_{air})$. In this example is found, $$n_{\mathit{eff}} = 1.0 \times 0.8 + 3.5 \times 0.2 = 1.5$$

This value is equivalent to that of $SiO_2$ in a buried-oxide (BOX) layer of a conventionally used SOI wafer. A difference Δn from the refractive index of the epitaxial growth silicon in the waveguide layer as a core layer, i.e. about 3.5, is about 2, enabling strong light-confinement. The fact that the strong light-confinement is enabled means that the light can be localized into a smaller volume when it is used as an optical waveguide or resonator, realizing miniaturization and high integration degree of the optical elements.

Next, the waveguide layer 21103 is formed with a thickness of about 0.2 μm, in which the waveguides 21104 and 21105 each have a width of about 0.2 μm. Those waveguides are composed of three porous silicon layers of (1) the above clad layer forming a lower layer, (2) a waveguide layer forming the side face, and (3) the following spacer layer forming an upper layer; the light-confinement is thus realized with a refractive index difference Δn of about 2, so the waveguides guide light straight, respectively. Due to the large refractive index difference, even a thin waveguide having a width of 1 μm or smaller can guide light with small loss.

Next, the spacer layer 21106 is formed with a thickness of about 0.1 μm. The thickness is a parameter for controlling the coupling strength between the upper straight waveguides 21104 and 21105, and the resonator 21108 and is determined according to the desired performance of the optical element. Also, the porosity of the porous silicon is about 80% in this example. The porosity is also a parameter for controlling the coupling strength between the above waveguides and the resonator via the above effective refractive index, and thus is determined in consideration of the layer thickness according to the desired performance of the optical element.

Next, the resonator layer 21107 is formed with a thickness of about 0.2 μm. The diameter of the microring resonator is set to about 2 μm in this example.

A feature of the present invention resides in the realization of such a micro resonator or fine waveguide. Thus, in addition to the advantage in terms of the high wavelength selectivity, for example, extremely high density integration can be realized in configuring a circuit network including a number of optical elements with this optical element used as a unit element.

Subsequently, the manufacturing method of the present invention, which realizes the aforementioned micro optical element, will be described with reference to FIGS. 22A to 22H. First, in step (1) in FIG. 22A, a silicon substrate 22101 is prepared. In step (2), a silicon layer 22102 having a porous structure is formed on the surface of the silicon substrate 22101 through anodization (FIG. 22B). Note that in the following description, the anodization of the present invention is preferably effected at a low temperature not higher than 0° C., e.g. about −20° C. This aims to obtaining a smooth surface at the boundary of the porous silicon formed through the anodization and suppressing optical loss, i.e. light scattering etc. Also, the term "porous" used in the present invention means the condition that the pore size is equal to about 1/100 or smaller of a wavelength of light used; for example, with respect to a light having a wavelength of 1.5 μm, a so-called Mesoporous-Si or Microporous-Si having a pore size of 10 nm or smaller is formed. The anodization can be carried out with the device structure as shown in FIG. 23, for example.

Figure 23:
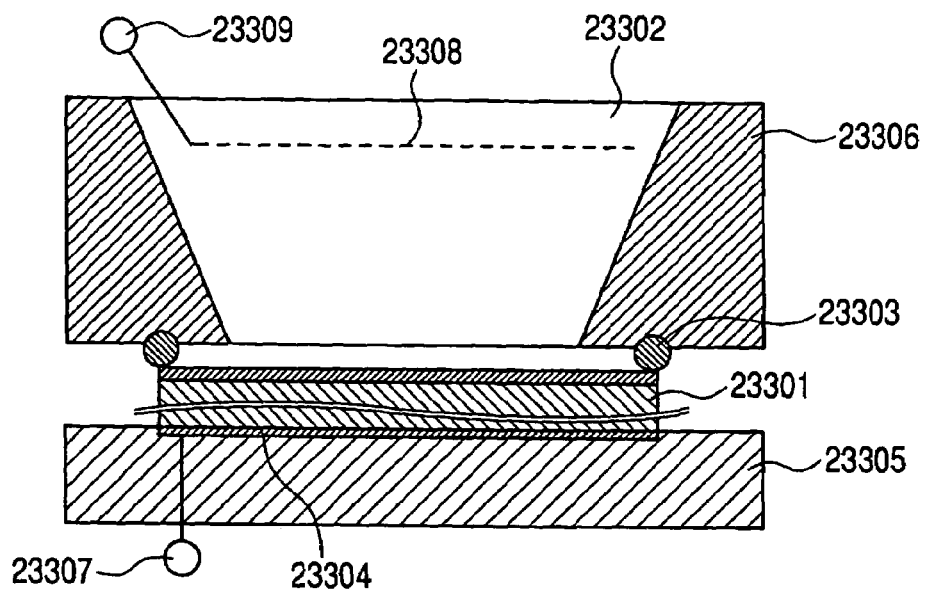
FIG. 23 is a schematic diagram showing an example of a method of making a crystal porous through anodization according to Example 6 of the present invention.

In FIG. 23, a silicon wafer (substrate) 23301 is held so as to immerse its epitaxial growth Si layer in a HF solution 23302. A lower supporting member 23305 and a upper supporting member 23306 hold the wafer through an O-ring 23303 and a Pt surface electrode 23304. The upper supporting member 23306 is provided with a HF solution tank communicating with the Si wafer 23301, which is filled with the HF solution 23302. A Pt mesh electrode 23308 is placed in the HF solution 23302. The Pt surface electrode 23304 and the Pt mesh electrode 23308 are connected to an anode 23307 and a cathode 23309, respectively. A predetermined electric field is applied to the Si wafer through the HF solution 23302 on the cathode side and through the Si substrate rear surface on the anode side for carrier injection. Note that the structure for anodization is not limited to that of this example, but generally-employed various methods can be used as appropriate.

Anodization conditions are listed below.
Starting wafer: p+(100)Si 0.01 Ωcm
Solution: HF, $C_2H_5OH$, $H_2O$
Anodization current: 150 mA/cm$^3$ Also, as for the anodization method, it is possible to collectively process plural wafers with a device structure as shown in FIGS. 4A to 4E. This step can be thus performed at a low cost.

Figure 24:
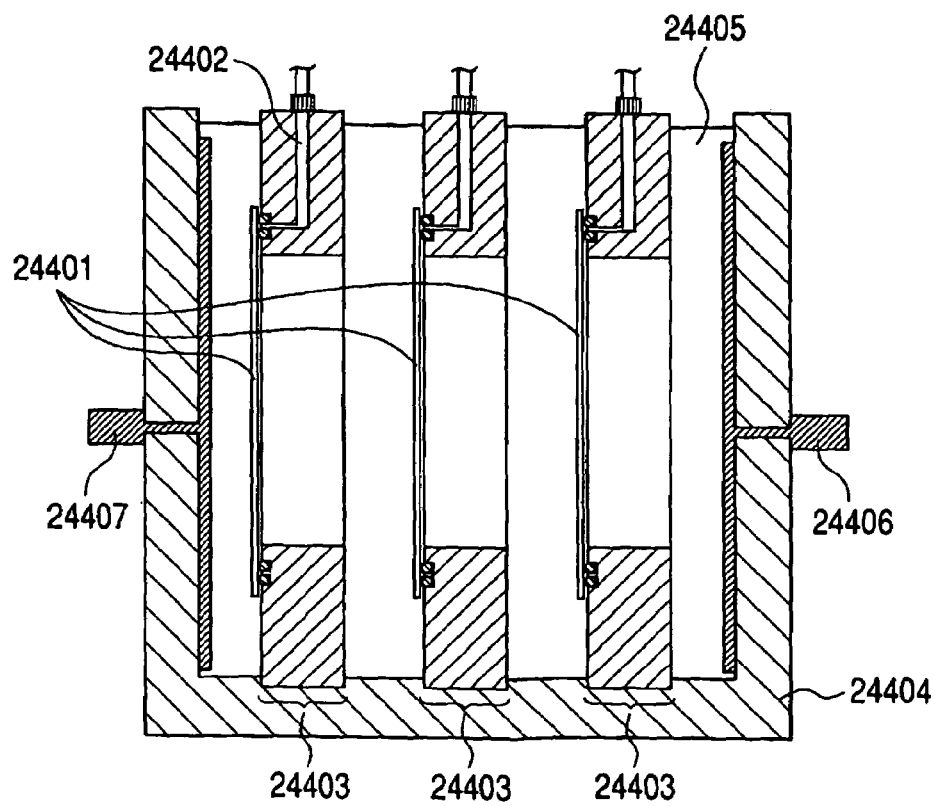
FIG. 24 is a schematic diagram showing another example of the method of making the crystal porous through the anodization according to Example 6 of the present invention.

Also, the pore size, density, and thickness of the porous silicon layer can be controlled over a wide range depending on the composition of an anodization solution, anodization current, conductivity type of the substrate, and conductivity thereof. Also, platinum having an extremely high resistance to hydrofluoric acid or metal covered with platinum on its surface is used as an electrode. In the case of collectively anodizing plural wafers into porous layers, as shown in FIG. 24, the anodization solution itself in contact with both sides of the wafer acts as an electrode. This enables uniform contact and enhances controllability of a porous layer to be formed.

As described above, the clad layer made of porous silicon is formed through anodization.

Subsequently, in step (3), epitaxial growth is promoted starting from the silicon surface forming the clad layer surface to form the silicon layer 22201 (FIG. 22C). In the epitaxial growth, as well known, the porous layer formed by the above method maintains its crystal orientation of the single crystal substrate, and a uniform, pore-free single crystal layer can be formed thereon through epitaxial growth.

Here, a description will be given of conditions for forming an epitaxial growth Si layer 22203 through the epitaxial growth on the porous Si layer 22202 by the chemical vapor deposition (CVD) method or the like. First, it is important to promote the epitaxial growth in a hydrogen atmosphere. Sealing of the pores in the surface of the porous layer is accelerated, and the epitaxial layer with high quality is formed thereon (Yonehara et al., "Appl. Phys. Lett.", Collective Report, September, 2002)

Epitaxial growth conditions are listed below.
Vapor deposition Temperature: 1,000° C.
Gas: $SiH_4/H_2$
Pressure: 700 Torr Subsequently, in step (4), the surface of the epitaxial growth silicon film formed in step (3) undergoes anodization to obtain a porous silicon layer. At this time, patterning is performed for part of in-plane portions, that is, the waveguides 22104 and 22105 are not made porous but remain the epitaxial growth silicon (FIG. 22D).

FIGS. 25A to 25G show two examples of a method of realizing anodization patterning, with which porous structure is formed at a desired portion alone, as described above. Note that in the following examples, a general method of patterning plural portions is described.

Figure 25E:
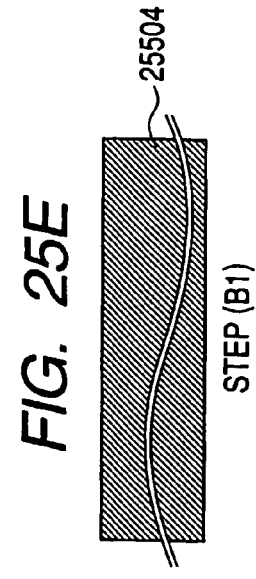
FIGS. 25A, 25B, 25C, 25D, 25E, 25F and 25G are schematic diagrams each showing an example of an in-plane patterning method for anodization according to Example 6 of the present invention.
Figure 25F:
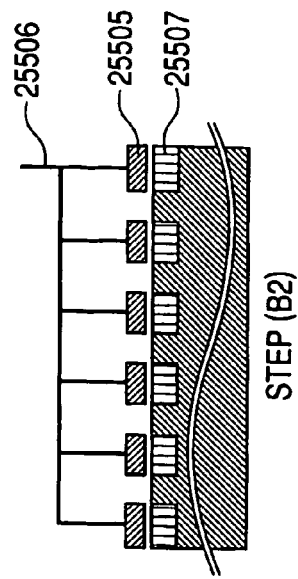
Figure 25G:
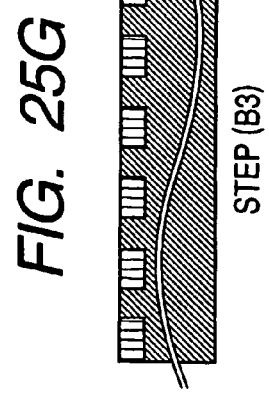
Figure 25A:
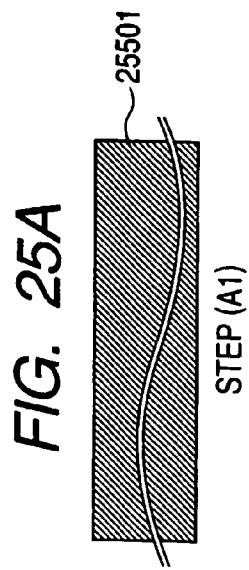
Figure 25B:
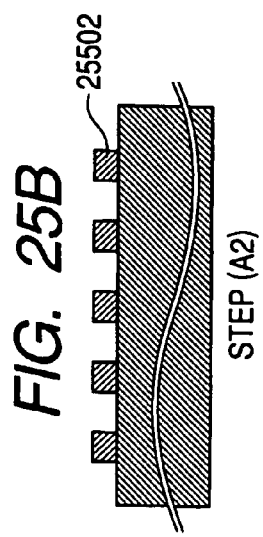
Figure 25C:
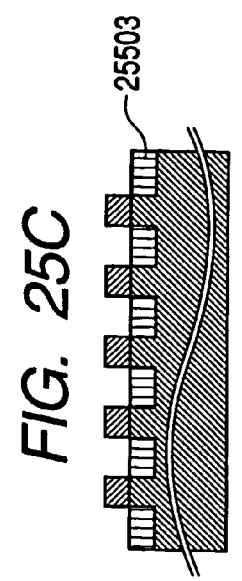
Figure 25D:
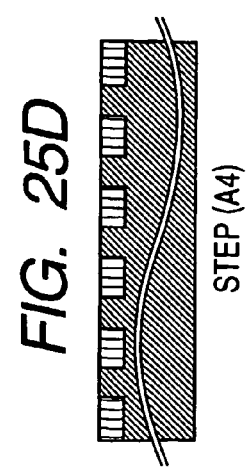

First, as an example A, as shown in FIG. 25A, a silicon substrate is prepared in step (A1). Next, as step (A2), a resist is applied to the silicon surface and patterned by the photolithographic technique (FIG. 25B). The pattern is formed so as to outline a portion to be anodized. In step (A3), an electric field is applied in an HF solution with the resist pattern being left thereon for anodization, with the result that the silicon surface covered with the resist is insulated and protected against injection of carriers and intrusion of the HF solution, and hence is not made porous through anodization (FIG. 25C). Accordingly, only portions not covered with the resist are made porous. After the resist is removed in step (A4), the silicon substrate is obtained where the porous portions are patterned (FIG. 25D).

Note that for resist patterning for anodization, various methods such as electron beam (EB) lithography, near-field photolithography, X-ray lithography, and ion beam lithography can be used as appropriate aside from the photolithography.

Next, as an example B, in step (B2) (FIG. 25F) of performing anodization in a HF solution on a silicon substrate prepared in step (B1) of FIG. 25E, unlike the general method of arranging a mesh electrode apart from a substrate and uniformly applying an electric field in an in-plane direction of the substrate as shown in FIGS. 5A to 5G, it is used such a structure that an electrode having a size substantially equal to a desired pattern is provided in the vicinity of a pole of the substrate and an electric field intensity varies in an in-plane direction. In other words, anodization proceeds in only portions close to the pole, which is applied with a high-intensity electric field to make the portions porous. In addition to patterning through local application of the electric field, the light may be locally applied to generate photocarriers, and the photocarriers may be used to accelerate the anodization.

As a subsequent step in the element manufacturing process, in FIG. 22E, epitaxial growth is promoted in silicon in step (5), as in step (3). In a subsequent step, i.e. step (6), the silicon is made porous through anodization into the spacer layer 22106 (FIG. 22F).

Next, a silicon layer for forming a resonator is laminated through epitaxial growth again (FIG. 22G). Then, as described in step (4), the silicon is made porous through anodization except for a portion corresponding to a microring resonator (FIG. 22H) at this time.

As described above, through steps (1) to (8) shown in FIGS. 22A to 22H, an optical element as the wavelength selection optical circuit of this example is formed as a monolithic silicon structure.

Further, in this example, the porous silicon is thermally oxidized at a rate about 100 times higher than the non-porous silicon portion (accelerated oxidation). Based on this, the porous silicon of the clad layer or of clad portion of the waveguide or resonator is subjected to thermal oxidation to turn it into porous $SiO_2$, thereby enabling a lower refractive index.

Note that a supplemental description of the background art will be briefly added here.

In recent years, a research about how to utilize SOI wafers to 2D slab type optical elements is being accelerated. The 2D slab type refers to such a type that clad layers having a low refractive index sandwich a core layer having a high refractive index to confine light into the core layer having a high refractive index and propagate the light therein to achieve light-confinement in a non-periodic direction.

In the case of using SOI wafers, the following functions are imparted to the SOI structure. First of all, $SiO_2$ formed on an Si substrate (BOX layer: buried oxide layer) is used for a clad, and Si formed thereon (SOI layer: silicon on insulator) is used for a core (see, Noutomi "Photonic Crystal Slab using SOI Slab", Appl. Phys. Lett., vol. 72, No. 7. 2003).

In this case, the slab thickness, that is, the thickness of the core layer, depends on the conditions under which the light can have an electromagnetic mode in the thickness direction. In particular, when only a single mode is allowed, an optical path length derived by multiplying the slab thickness by the refractive index is equal to about ½ of the wavelength. In other words, one round-trip optical path length approximates one wavelength. This corresponds to such a condition that the smallest thickness is used to allow light that has made one round-trip to interfere with light that has made several round trips, thereby strengthening each other. In practice, in consideration of the penetration of the light to the clad layer, the thickness is calculated (see, Koshiba "Optical Waveguide Analysis", Asakura Shoten, 1990).

In the case of using such an Si material, there are the following advantages. That is, (1) manufacturing techniques for SOI wafers are developed to a practical level and its precision is secured, and (2) sophisticated techniques of the Si process can be used for patterning techniques for forming a periodic pattern in an SOI layer being a core layer.

Among 2D slab elements using SOI, the 2D slab photonic crystal is the most famous subject of research (see Sato "Photonic Crystal Technique and its Application" p. 229, 2002, CMC Publishing), but there is an Si thin waveguide that is expected to produce the same effect as in the photonic crystal. In this case as well, research and development are under way on light-confinement into a thin micro waveguide having a thickness of 1 µm or less as in the 2D slab photonic crystal, utilizing a large difference in refractive index between Si and $SiO_2$, or a device such as a bent waveguide element having a small curvature (see, Kawakami et al., "Photonic Crystal Technique and its Application", pp. 252, 257, and 258, 2002, CMC publishing Co., Ltd.).

Also, in recent years, an attempt has been made to produce a micro routing element in which the ring resonator and straight waveguide are combined, which has been under study so far (see, Kokubun "Microring Resonator Optical Routing Element", Appl. Phys., vol. 72, No. 11, 2003) by using the above-described waveguide system having a large refractive index difference which uses a SOI wafer.

In the case of using the SOI wafer for the 2D slab type photonic crystal or thin waveguide, the BOX layer is required to have a relatively large thickness, for example, desirably 1 µm or larger. This is due to the light-confinement condition. That is, in the case of light-confinement in the core layer, as mentioned above, the light penetrates to the clad layer, and if the clad layer is thin, the evanescent mode of penetrated light is coupled to a radiation mode to the substrate, resulting in the radiation loss in the substrate direction.

The publication of Kawakami et al. describes a calculation example regarding the requisite thickness of the BOX layer with the allowable loss set to −40 dB.

In manufacturing SOI having a thick BOX layer having a thickness of 1 µm or larger, it is necessary to employ a so-called bonding type manufacturing method. As for bonded wafers of this type, there are wafers reported in Cited Document A (Celler and Yasuda "Current Condition of MEMS SOI wafer" May 2002, Electron Technology) and Cited Document B (Iyer and Auberton-Herve "SILICON WAFER BOUNDING TECHNOLOGY for VLSI and MEMS applications", EMIS PROCESSING-SERIES 1, ISBN 0 85296 039 5, 2002, The Institution of Electrical Engineers) and these have been put into practical use.

However, for manufacturing such bonded wafers, a bonding step should be involved. Besides, plural starting wafers should pass through complicated steps such as a seed wafer cutting step accompanied with an $H^+$ ion implantation step. As a result, as compared with general Si wafers etc., special structure and process are necessary for elements to be formed therewith. In addition, the wafer itself costs high. Its application has been undesirably limited to a high-value added semiconductor logic circuit such as a CPU worth high cost.

Further, in the case of manufacturing a routing element in which a ring resonator and a straight waveguide are combined by using a SOI structure, as for a circuit configuration composed of a three-dimensional waveguide and resonator having two or more core layers, which is said to produce a highly effective element, there is such a disadvantage that the SOI wafer involves the need to bond two SOI wafers after patterning on an intermediate layer (wafer bonding) and requires a higher cost.

The above problems can be solved by applying Example 6 of the present invention.

Example 7

This example relates to a circuit network realized by the present invention which is formed by combining plural three-dimensional elements where a thin waveguide and a microring resonator are optically coupled, in an in-plane direction. In particular, this example has the feature that patterning is carried with varying selectivity of the circuit by varying porosity of the spacer layer which contributes to coupling between the optical resonator and waveguide for each element (or each area). Hereinafter, referring to FIG. 26, an optical circuit element of this example will be described.

Figure 26:
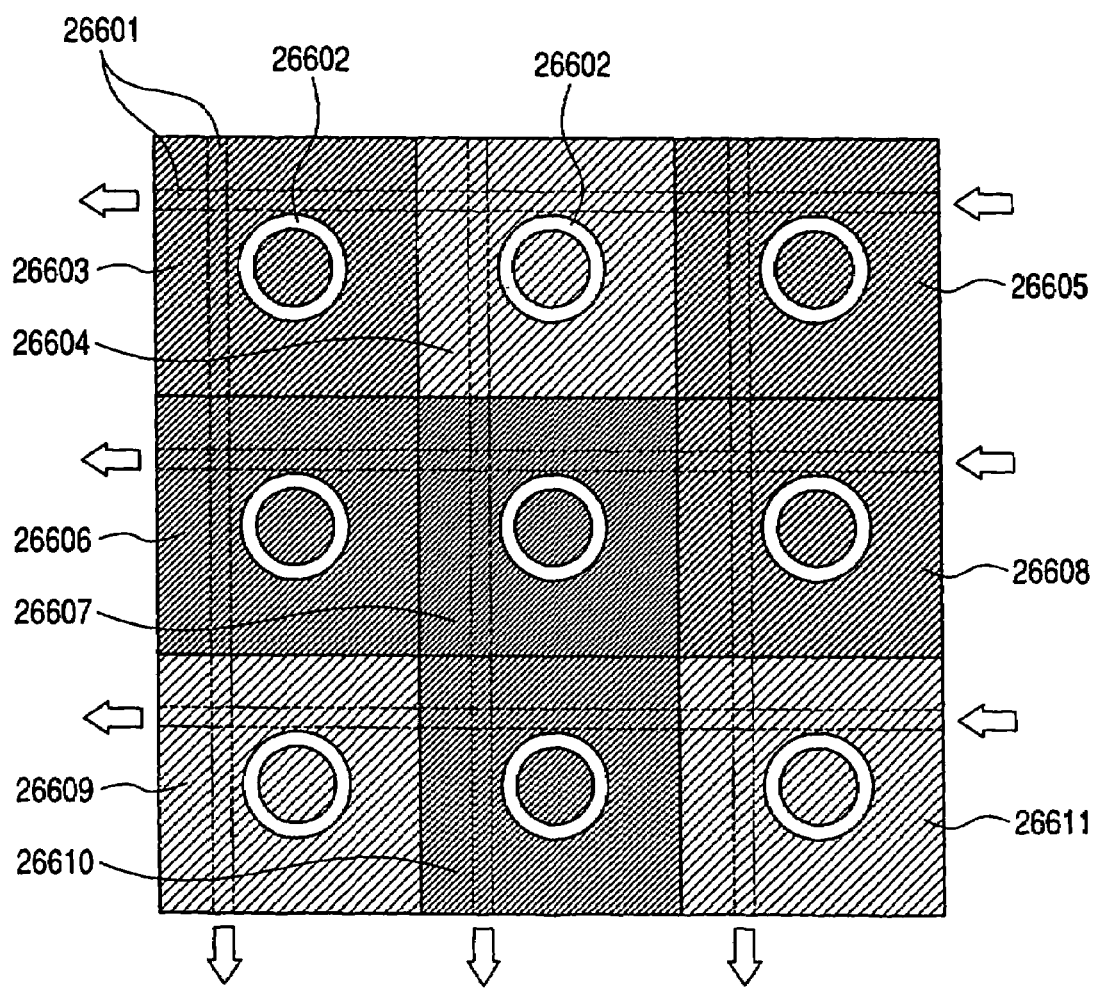
FIG. 26 is a schematic diagram showing an example of an optical circuit where plural elements are provided in plane according to Example 7 of the present invention.

FIG. 26 is a top view of the optical circuit element of this example. However, portions assigned with reference numerals 26603 to 26611 are shown as perspective images.

First, in this optical circuit element, nine (3×3) light selection elements including two waveguides and one microring resonator of Example 1 are arranged two-dimensionally. The elements are connected at the boundaries of the waveguides as shown; in the figure in which three waveguides are arranged lengthwise and crosswise, respectively. As for a manufacturing method therefor, six waveguides in total and nine microring resonators are formed collectively in each plane through patterning according to the method of Example 1. The microring resonator of this example is formed with absolutely the same size and similar positional relationship with the waveguide (distance therefrom).

Next, description is given of a portion of this example making use of the present invention, that is, a spacer layer which couples the waveguide layer and the resonator layer. Regarding the spacer layer, nine regions in the same plane are collectively formed similar to the waveguide layer and resonator layer. Note that upon the formation, the anodization conditions may be changed for each region so as to obtain respective predetermined porosities. A method of anodizing the regions for the different porosities is similar to the example B of the patterning method described above with reference to FIGS. 25E to 25G, that is, a method of anodizing the regions using plural electrodes, which is realized by changing an applied electric field for each of the plural electrodes.

Nine light selection elements formed of the spacer layer having different porosities for the regions have a coupling strength different from the waveguide since, even if the sizes and positions of the microring resonators are the same, the effective refractive indexes of the spacer layers are different. Thus, the nine light selection elements (regions) which form coupling between the waveguides can have different characteristics An important effect of this example described so far is given below. That is, only one condition needs to be met for a factor such as the position or size of the microring portion depending on the miniaturization process. If the difference in element characteristics is attained by slightly changing the size or position of the microring resonator, it is necessary to precisely control them. However, in this example, a single condition is set therefor, thereby enabling simpler and stable control.

The present invention is not limited to the above-mentioned examples, but allows various changes in sequence flows etc. without departing from the gist of the present invention.

Figure 27A:
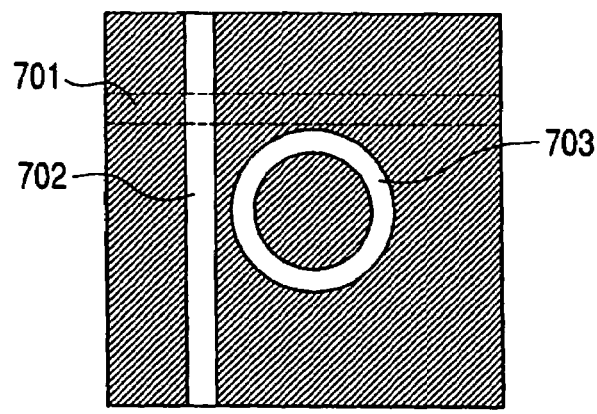
FIGS. 27A and 27B are schematic diagrams each showing a modified example of Example 6 of the present invention.
Figure 27B:
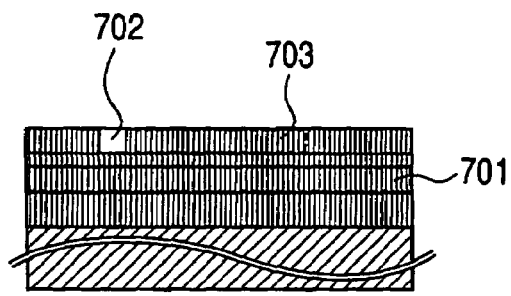
Figure 27C:
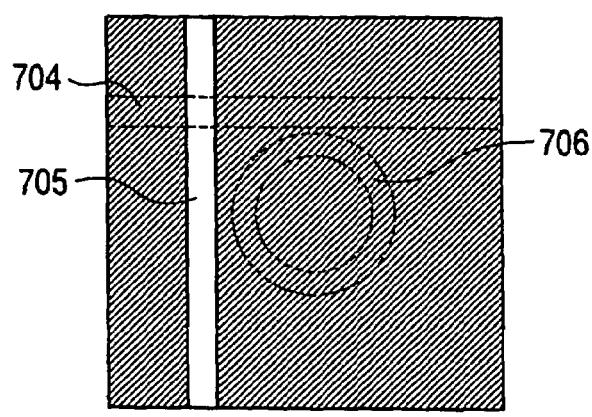
FIGS. 27C and 27D are schematic diagrams each showing another modified example of Example 6 of the present invention.
Figure 27D:
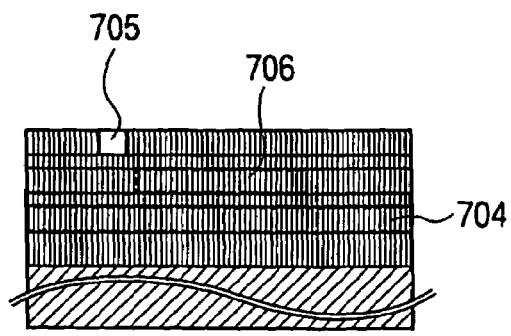

For example, in Example 1, the waveguides extending in two different directions are connected and arranged in the same layer, but may be formed in different layers. For example, as shown in FIGS. 27A and 27B, one of the waveguides may coexist in the resonator layer. Alternatively, as shown in FIGS. 27C and 27D, the two waveguides and the resonator may be arranged in different layers and separated through the spacer layers to be optically coupled.

The present invention is not limited to the aforementioned silicon material but can be similarly implemented by using a III–V compound semiconductor such as GaAs, Ge, GaP, AlGaAs, InGaAs, InAs, GaInNAs, InGaP, or InP, or II–VI semiconductor such as CdSe or CdS, or a combination of an epitaxial growth material and a substrate material having similar lattice constants and/or linear expansion coefficients, such as GaAs and Ge.

The optical element of the present invention is formed using a monolithic optical element structure where a porous silicon and porous $SiO_2$ prepared through anodization as well as a silicon layer formed through epitaxial growth are laminated after in-plane patterning, and has a high performance and precision. The optical element can be used for optical communication or information processors using light.

INDUSTRIAL APPLICABILITY

The optical element according to the present invention is applicable in a wide range of applications, such as an optical communication including image display, image transfer and data communication, an information processor using light, and in addition a sensor and detection system for detecting various types of information such as image information and bio information with high sensitivity.

This application claims priority from Japanese Patent Application No. 2003-434555 filed Dec. 26, 2003, and Japanese Patent Application No. 2004-033507 filed on Feb. 10, 2004 which are hereby incorporated by reference herein.

The invention claimed is:

1. An optical element, comprising:

a first porous region;

a second porous region; and a non-porous region formed between the first porous region and the second porous region, the non-porous region having a refractive index higher than a refractive index of the first porous region, wherein a first layer including the first porous region is formed, a second layer including the second porous region is formed, and a third layer including the non-porous region is formed between the first layer and the second layer and has in its in-plane direction a region with a refractive index different from the refractive index of the non-porous region, wherein the non-porous region functions as an optical waveguide, and a spacer layer of a porous structure is formed between the second layer and the third layer, wherein the spacer layer includes in its in-plane direction a plurality of regions different in refractive index.

2. The optical element according to claim 1, wherein the region in the third layer with the refractive index different from the refractive index of the non-porous region has a porous structure.

3. A light emitting element, comprising:

an optical resonator comprised of the optical element according to claim 1; and a light emitting substance provided to at least one of an inner portion and vicinity of the optical resonator.

4. An information processor, comprising:

the optical element according to claim 1; and a light emitting portion.

* * * * *

UNITED STATES PATENT AND TRADEMARK OFFICE
CERTIFICATE OF CORRECTION

PATENT NO. : 7,231,123 B2
APPLICATION NO. : 10/558830
DATED : June 12, 2007
INVENTOR(S) : Mitsuro Sugita, et al.

It is certified that error appears in the above-identified patent and that said Letters Patent is hereby corrected as shown below:

COLUMN 15:
Line 29, "detect." should read --defect.--.

COLUMN 18:
Line 18, "growth..material" should read --growth material--.

COLUMN 21:
Line 6, "a" should read --an--.
Line 59, "2002)" should read --2002).--.

COLUMN 24:
Line 16, "BOUNDING" should read --BONDING--.

COLUMN 25:
Line 15, "acteristics" should read --acteristics.--.

Signed and Sealed this

First Day of April, 2008

JON W. DUDAS
*Director of the United States Patent and Trademark Office*